(12) United States Patent
Kusashima et al.

(10) Patent No.: US 10,326,619 B2
(45) Date of Patent: Jun. 18, 2019

(54) TERMINAL DEVICE

(71) Applicant: SHARP KABUSHIKI KAISHA, Sakai, Osaka (JP)

(72) Inventors: Naoki Kusashima, Sakai (JP); Kazuyuki Shimezawa, Sakai (JP); Shoichi Suzuki, Sakai (JP); Wataru Ouchi, Sakai (JP); Kazunari Yokomakura, Sakai (JP); Alvaro Ruiz Delgado, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 15/573,725

(22) PCT Filed: May 16, 2016

(86) PCT No.: PCT/JP2016/064479
§ 371 (c)(1),
(2) Date: Nov. 13, 2017

(87) PCT Pub. No.: WO2016/186077
PCT Pub. Date: Nov. 24, 2016

(65) Prior Publication Data
US 2018/0145851 A1    May 24, 2018

(30) Foreign Application Priority Data

May 15, 2015    (JP) .................................. 2015-099552

(51) Int. Cl.
*H04L 25/02*     (2006.01)
*H04W 16/14*    (2009.01)
(Continued)

(52) U.S. Cl.
CPC ...... *H04L 25/0226* (2013.01); *H04J 11/0079* (2013.01); *H04L 5/001* (2013.01);
(Continued)

(58) Field of Classification Search
CPC .... H04L 5/0035; H04W 72/04; H04W 72/042
See application file for complete search history.

(56) References Cited

U.S. PATENT DOCUMENTS

2015/0208392 A1* 7/2015 Park ...................... H04B 7/024
370/329
2016/0227519 A1* 8/2016 Nimbalker ............ H04L 5/0094

OTHER PUBLICATIONS

Source: Alcatel-Lucent, Alcatel-Lucent Shanghai Bell; Title: RS Design for LLA; Agenda item:7.2.3.3; Document for: Discussion/Decision; R1-150192; 3GPP TSG RAN WG1 Meeting #80; Athens,Greece, Feb. 9-13, 2015.
(Continued)

*Primary Examiner* — Shukri Taha
(74) *Attorney, Agent, or Firm* — ScienBiziP, P.C.

(57) ABSTRACT

A cell where an Unlicensed spectrum or shared spectrum is used is efficiently controlled. A terminal device includes a measurement unit configured to measure Channel State Information (CSI) based on a valid downlink subframe based on a Serving cell. A subframe is considered to be the valid downlink subframe in a case that a condition is met, the condition includes that a configured CSI Reference Signal (CSI-RS) resource associated with a Channel State Information process exists in the subframe, and the Serving cell is a Licensed-Assisted Access (LAA) Secondary cell.

4 Claims, 7 Drawing Sheets

(51) Int. Cl.
  *H04W 72/04* (2009.01)
  *H04W 72/08* (2009.01)
  *H04J 11/00* (2006.01)
  *H04L 5/00* (2006.01)
  *H04L 27/00* (2006.01)
  *H04L 5/14* (2006.01)
(52) U.S. Cl.
  CPC ........ *H04L 5/0057* (2013.01); *H04L 27/0006* (2013.01); *H04W 16/14* (2013.01); *H04W 72/04* (2013.01); *H04W 72/08* (2013.01); *H04J 2211/005* (2013.01); *H04L 5/0053* (2013.01); *H04L 5/1469* (2013.01)

(56) References Cited

OTHER PUBLICATIONS

Source: Ericsson; Title: Further discussion on support of CSI Measurement and Reporting for LAA; Agenda Item:7.2.4.2.; Document for: Discussion and Decision; R1-152011; 3GPP TSG RAN WG1 Meeting #80bis; Belgrade, Serbia, Apr. 20-24, 2015.

3rd Generation Partnership Project; Technical Specification Group Radio Access Network; Evolved Universal Terrestrial Radio Access (E-UTRA); Physical layer procedures; (Release 12); 3GPP TS 36.213 V12.4.0; Valbonne, France.

Source: Alcatel-LucentShanghai Bell, Alcatel-Lucent; Title: Comparison of signalling mechanisms for TDD UL-DL reconfiguration; Document for: Discussion/Decision; R1-132053; 3GPP TSG RAN WG1 Meeting #73; Fukuoka,Japan, May 20-24, 2013.

Source: Ericsson, Qualcomm, Huawei, Alcatel-Lucent; Title: Study on Licensed-Assisted Access using LTE; Document for: Approval; Agenda Item: 14.1.1; RP-141664; 3GPP TSG RAN Meeting #65; Edinburgh, Scotland, Sep. 9-12, 2014.

Ericsson. "PHY-Layer Options to Support CSI Measurement and Reporting for LAA", R1-151138, 3GPP TSG RAN WG1 Ad-hoc Meeting, Paris, France, Mar. 24th-26th, 2015.

Motorola Mobility, "Physical Layer enhancement options for LAA-LTE", R1-151091, 3GPP TSG RAN WG1 LAA-Ad hoc, Mar. 24-26, 2015, Paris, France.

Huawei, Hisilicon, "CSI measurement and feedback for LAA", R1-151301, 3GPP TSG RAN WG1 80bis Meeting, Belgrade, Serbia, Apr. 20th - 24th, 2015.

* cited by examiner

TERMINAL DEVICE

TECHNICAL FIELD

Embodiments of the present invention relate to a technique of a terminal device, a base station device, a communication method, and an integrated circuit that achieve efficient communication.

BACKGROUND ART

The 3rd Generation Partnership Project (3GPP), which is a standardization project, standardized the Evolved Universal Terrestrial Radio Access (hereinafter referred to as the "E-UTRA"), in which high-speed communication is realized by adopting an Orthogonal Frequency-Division Multiplexing (OFDM) communication scheme and flexible scheduling using a unit of prescribed frequency and time called resource block.

Moreover, the 3GPP discusses the Advanced E-UTRA, which realizes higher-speed data transmission and has upper compatibility with the E-UTRA. The E-UTRA relates to a communication system based on a network in which base station devices have substantially the same cell configuration (cell size); however, regarding the Advanced E-UTRA, discussion is made on a communication system based on a network (different-type radio network, Heterogeneous Network) in which base station devices (cells) having different configurations coexist in the same area. The E-UTRA is also referred to as the "Long Term Evolution (LTE)", and the Advanced E-UTRA is also referred to as the "LTE-Advanced". The LTE may be a general term including the LTE-Advanced.

A carrier aggregation (CA) technique and a dual connectivity (DC) technique are defined, in which, in a communication system where cells (macro cells) having large cell radii and cells (small cells) having smaller cell radii than those of the macro cells coexist as in a heterogeneous network, a terminal device performs communication by connecting to a macro cell and a small cell at the same time (NPL 1).

On the other hand, discussion is made on Licensed-Assisted Access (LAA) in NPL 2. In the LAA, an Unlicensed spectrum used in a wireless Local Area Network (LAN) is used as the LTE, for example. Specifically, the Unlicensed spectrum is configured as a Secondary cell (secondary component carrier). The Secondary cell used as the LAA is assisted regarding connection, communication, and/or configuration by a Primary cell (primary component carrier) configured in a Licensed spectrum. The LAA extends a spectrum available to the LTE, allowing broadband transmission. The LAA is also used in a shared spectrum which is shared between predetermined operators.

CITATION LIST

Non Patent Literature

NPL 1: 3rd Generation Partnership Project; Technical Specification Group Radio Access Network; Evolved Universal Terrestrial Radio Access (E-UTRA); Physical layer procedures (Release 12), 3GPP TS 36.213 V12.4.0 (2014-12).

NPL 2: RP-141664, Ericsson, Qualcomm, Huawei, Alcatel-Lucent, "Study on Licensed-Assisted Access using LTE", 3GPP TSG RAN Meeting #65, September 2014.

SUMMARY OF INVENTION

Technical Problem

In the LAA, in a case that an Unlicensed spectrum or a shared spectrum is used, the spectrum is shared with another system and/or another operator. However, the LTE is designed on the assumption of being used in a Licensed spectrum or a non-shared spectrum. Therefore, LTE of the related art cannot be used in the Unlicensed spectrum or the shared spectrum.

The present invention has been made in light of the foregoing, and an object of the present invention is to provide a terminal device, a base station device, and a communication method that enable efficient control of a cell which uses an Unlicensed spectrum or a shared spectrum.

Solution to Problem (1) To accomplish the object described above, the present invention is contrived to provide the following means. Specifically, a terminal device according to an aspect of the present invention is a terminal device including a measurement unit configured to measure Channel State Information (CSI) based on a valid downlink subframe based on a Serving cell. A subframe is considered to be the valid downlink subframe in a case that a condition is met, the condition includes that a configured CSI Reference Signal (CSI-RS) resource associated with a Channel State Information process is in the subframe, and the Serving cell is a Licensed-Assisted Access (LAA) Secondary cell.

(2) The terminal device according to an aspect of the present invention is the above-described terminal device, in which the condition includes that the subframe is configured as a downlink subframe or a special subframe, that the subframe is not a Multimedia Broadcast multicast service Single Frequency Network (MBSFN) subframe, and that the subframe does not fall within a configured measurement gap, for periodic CSI reporting, the condition includes that the subframe is an element of a CSI subframe set linked to the periodic CSI reporting, and for aperiodic CSI reporting for the CSI process, the condition includes that the subframe is an element of a CSI subframe set linked to a subframe with a corresponding CSI request in an uplink Downlink Control Information (DCI) format.

(3) The terminal device according to an aspect of the present invention is the above-described terminal device, in which in a case that the configured CSI Reference Signal resource associated with the Channel State Information process is not in the subframe, the subframe is considered not to be the valid downlink subframe.

(4) The subframe is considered to be the valid downlink subframe according to a field in downlink control information, the field indicates configuration of Orthogonal Frequency-Division Multiplexing (OFDM) symbols in the subframe, and the OFDM symbols are used for transmission of at least one of a physical downlink channel and a physical downlink signal.

(5) The terminal device according to an aspect of the present invention is the above-described terminal device, in which in a case that the field in the downlink control information indicates that at least one OFDM symbol in the subframe is not used for the transmission, the subframe is considered not to be the valid downlink subframe.

(6) The terminal device according to an aspect of the present invention is the above-described terminal device, in which in a case that the field in the downlink control information indicates that all the OFDM symbols in the subframe are used for the transmission, the subframe is considered to be the valid downlink subframe.

(7) The terminal device according to an aspect of the present invention is the above-described terminal device, in which a Physical Downlink Control Channel (PDCCH) with the downlink control information including Cyclic Redundancy Check (CRC) scrambled by a Radio Network Temporary Identifier (RNTI) is detected.

Advantageous Effects of Invention

The present invention can provide improved transmission efficiency in a radio communication system in which a base station device and a terminal device communicate.

DESCRIPTION OF EMBODIMENTS

First Embodiment

A first embodiment of the present invention will be described below. Description will be given by using a communication system (cellular system) in which a base station device (base station, NodeB, or eNodeB (eNB)) and a terminal device (terminal, mobile station, user device, or User equipment (UE)) communicate in a cell.

Main physical channels and physical signals used in EUTRA and Advanced EUTRA will be described. The channel refers to a medium used to transmit a signal, and the physical channel refers to a physical medium used to transmit a signal. In the present embodiment, the physical channel may be used as a synonym of signal. In the future EUTRA and Advanced EUTRA, the physical channel may be added or its constitution and format type may be changed or added; however, the description of the present embodiment will not be affected even in a case where the channel is changed or added.

In EUTRA and Advanced EUTRA, scheduling of a physical channel or a physical signal is managed by using a radio frame. A single radio frame is 10 ms in length, and a single radio frame is constituted of 10 subframes. In addition, a single subframe is constituted of two slots (i.e., one subframe is 1 ms in length, and a single slot is 0.5 ms in length).

Moreover, scheduling is managed by using a resource block as a minimum unit of scheduling for allocating a physical channel. The resource block is defined by a certain frequency domain constituted of a set of multiple subcarriers (e.g., 12 subcarriers) on a frequency axis and a domain constituted of a certain transmission time period (a single slot).

Figure 1:
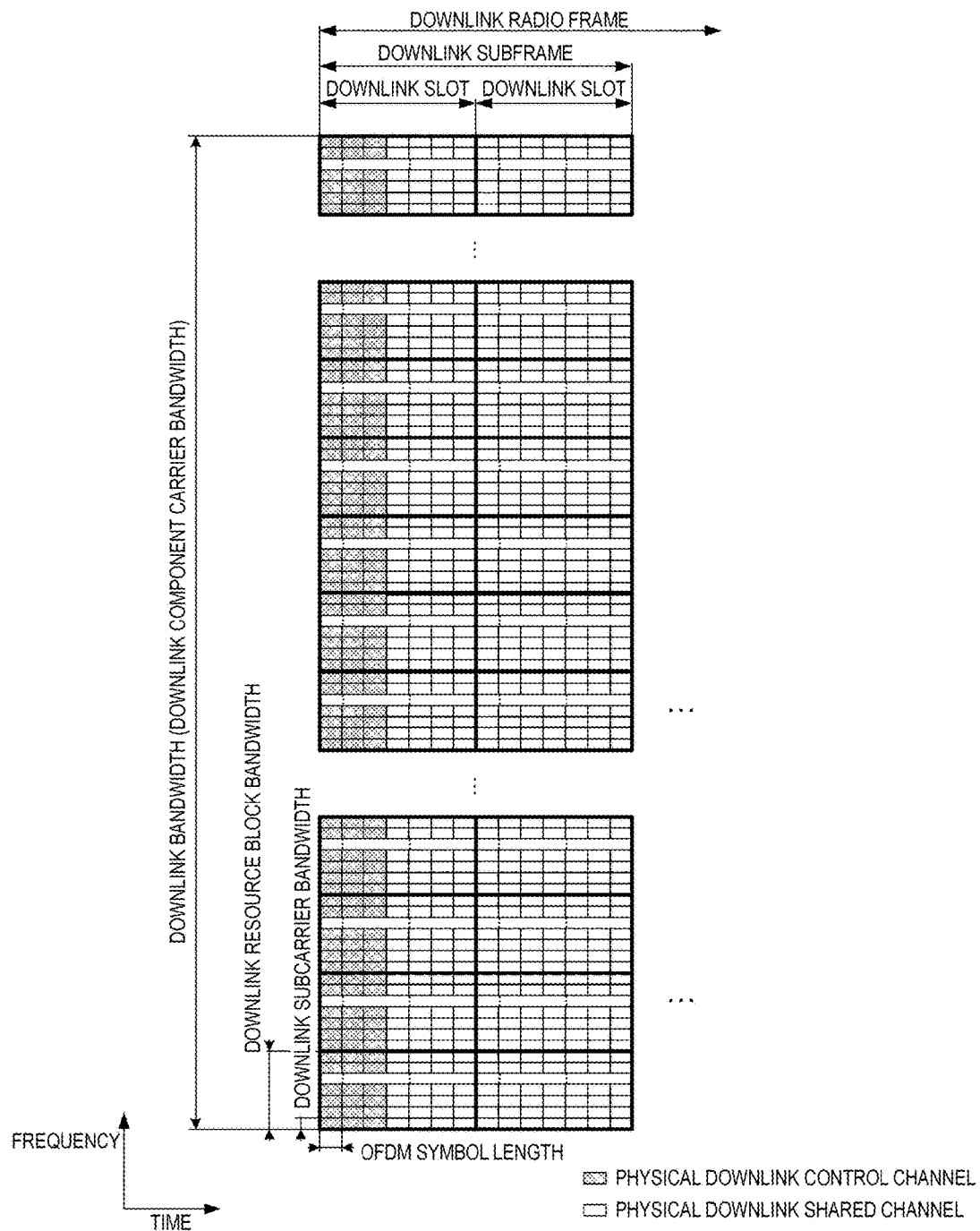
FIG. 1 is a diagram illustrating an example of a downlink radio frame configuration according to the present embodiment.

FIG. 1 is a diagram illustrating an example of a downlink radio frame configuration according to the present embodiment. The downlink uses an OFDM access scheme. In the downlink, a PDCCH, an EPDCCH, a Physical Downlink Shared CHannel (PDSCH), and the like are allocated. A downlink radio frame is constituted by a downlink Resource Block (RB) pair. This downlink RB pair is a unit for allocation of a downlink radio resource and the like and is based on the frequency band of a predefined width (RB bandwidth) and a time duration (two slots=1 subframe). Each of the downlink RB pairs is constituted of two downlink RBs (RB bandwidth×slot) that are contiguous in the time domain. Each of the downlink RBs is constituted of 12 subcarriers in the frequency domain. In the time domain, the downlink RB is constituted of seven OFDM symbols when a normal cyclic prefix (CP) is added, while the downlink RB is constituted of six OFDM symbols when a cyclic prefix that is longer than the normal cyclic prefix is added. A domain defined by a single subcarrier in the frequency domain and a single OFDM symbol in the time domain is referred to as a "Resource Element (RE)". A Physical Downlink Control Channel is a physical channel on which downlink control information such as a terminal device identifier, Physical Downlink Shared Channel scheduling information, Physical Uplink Shared Channel scheduling information, and a modulation scheme, coding rate, and retransmission parameter are transmitted. Note that, although a downlink subframe in a single Component Carrier (CC) is described here, a downlink subframe is defined for each CC and downlink subframes are approximately synchronized between the CCs.

Although not illustrated here, Synchronization Signals, a Physical Broadcast Information Channel, and a downlink Reference Signal (RS) may be assigned, to a downlink subframe. Examples of a downlink Reference Signal include a Cell-specific Reference Signal (CRS: Cell-specific RS), which is transmitted through the same transmission port as that for a PDCCH, a Channel State Information Reference Signal (CSI-RS, non-zero-power CSI-RS (NZP CSI-RS)), which is used to measure Channel State Information (CSI), a terminal-specific Reference Signal (URS: UE-specific RS)), which is transmitted through the same transmission port as that of one or some PDSCHs, and a Demodulation Reference Signal (DMRS, Demodulation RS), which is transmitted through the same transmission port as that for an EPDCCH. Moreover, carriers on which no CRS is assigned may be used. In this case, a signal (referred to as an "enhanced Synchronization Signal") similar to a signal corresponding to one or some transmission ports (e.g., only transmission port 0) or all the transmission ports for the CRSs can be inserted into one or some subframes (e.g., the first and sixth subframes in the radio frame) as time and/or frequency tracking signals. The terminal-specific Reference Signal transmitted through the same transmission port as that of one or some PDSCHs is also referred to as a "terminal-specific Reference Signal associated with a PDSCH" or a "DMRS". The Demodulation Reference Signal transmitted through the same transmission port as that of the EPDCCH is also referred to as a "DMRS associated with an EPDCCH".

Although not illustrated here, a zero-power CSI-RS (ZP CSI-RS) used mainly for rate matching of the simultaneously transmitted PDSCHs, or CSI interference management (CSI-IM) used mainly for interference measurement of the Channel State Information may be assigned to the downlink subframe. The zero-power CSI-RS and the CSI-IM may be assigned to the Resource Element to which the non-zero-power CSI-RS can be assigned. The CSI-IM may be configured to be superimposed on the zero-power CSI-RS.

Although not illustrated here, a Discovery Signal (DS) may be assigned to the downlink subframe. In a cell, the DS (DS Occasion) is constituted of a time period (DS period) of a prescribed number of contiguous subframes. The prescribed number is 1 to 5 in FDD (Frame structure type 1), and 2 to 5 in TDD (Frame structure type 2). The prescribed number is configured by RRC signaling. The DS period or its configuration is also referred to as a "Discovery signals measurement timing configuration (DMTC)". The terminal presumes that the DS is transmitted (mapped, generated) for each subframe configured by a parameter dmtc-Periodicity configured by RRC signaling. The terminal presumes that the DS configured to include the following signals exists in the downlink subframe.

(1) An CRS on an antenna port 0 within a DwPTS of all the downlink subframes and all special subframes in the DS period.

(2) A PSS in the first subframe in the DS period in FDD. A PSS in the second subframe in the DS period in TDD.

(3) An SSS in the first subframe in the DS period.

(4) A non-zero-power CSI-RS in zero or more subframe in the DS period. The non-zero-power CSI-RS is configured by RRS signaling.

The terminal performs measurement based on the configured DS. The measurement is performed by using the CRS in the DS or the non-zero-power CSI-RS in the DS. In the configuration concerning the DS, multiple non-zero-power CSI-RSs can be configured.

Figure 2:
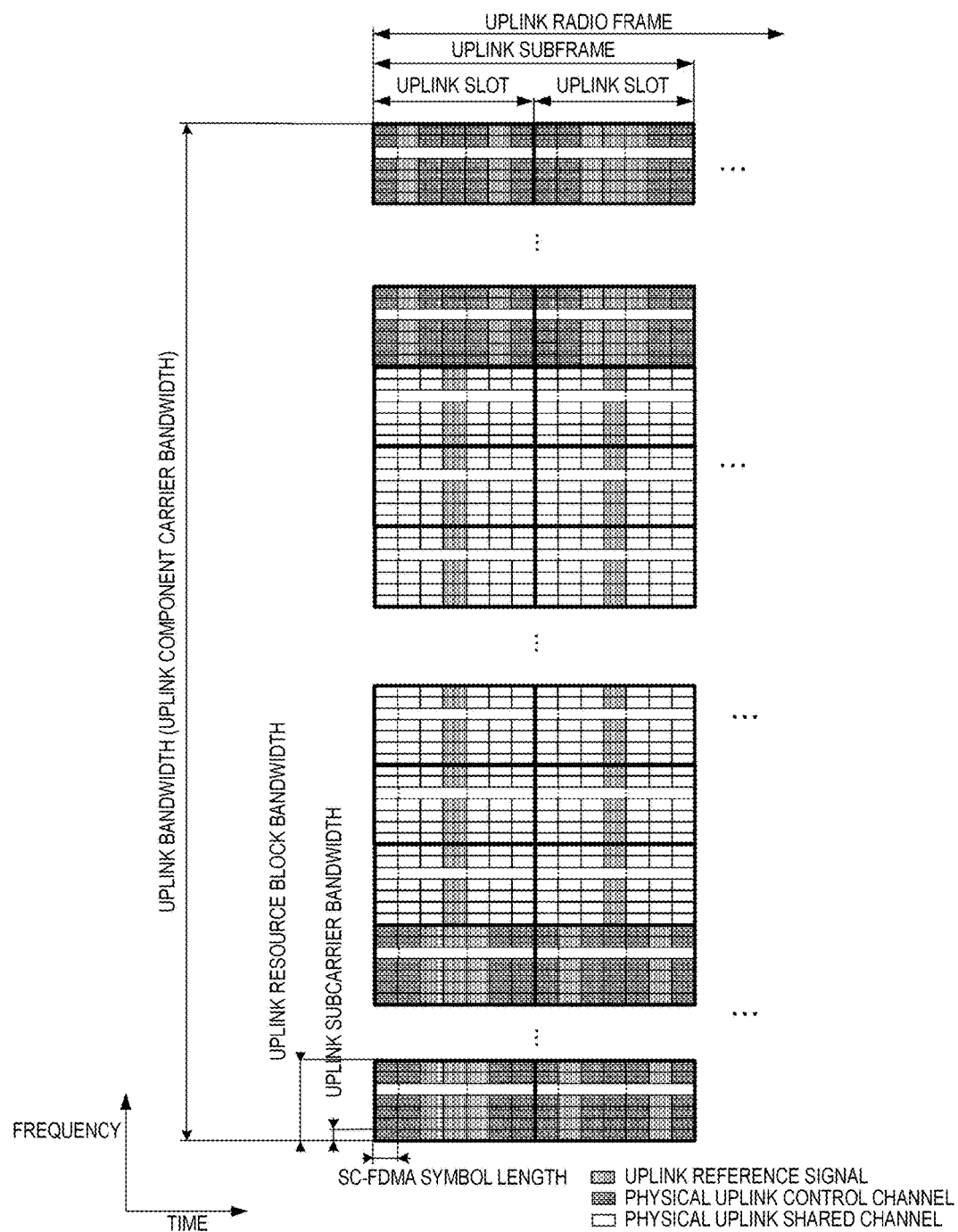
FIG. 2 is a diagram illustrating an example of an uplink radio frame configuration according to the present embodiment.

FIG. 2 is a diagram illustrating an example of an uplink radio frame configuration according to the present embodiment. The uplink uses an SC-FDMA scheme. In the uplink, a Physical Uplink Shared Channel (PUSCH), a PUCCH, and the like are allocated. An uplink Reference Signal is assigned to one or some of PUSCHs and PUCCHs. An uplink radio frame is constituted of uplink RB pairs. This uplink RB pair is a unit for allocation of uplink radio resources and the like and is constituted by the frequency band of a predefined width (RB bandwidth) and a predetermined time duration (two slots=1 subframe). A single uplink RB pair is constituted by two uplink RBs (RB bandwidth× slots) that are contiguous in the time domain. Each of the uplink RBs is constituted of 12 subcarriers in the frequency domain. In the time domain, the uplink RB is constituted of seven SC-FDMA symbols when a normal cyclic prefix is added, while the uplink RB is constituted of six SC-FDMA symbols when a cyclic prefix that is longer than the normal cyclic prefix is added. Note that although an uplink subframe in a single CC is described here, an uplink subframe is defined for each CC.

A Synchronization Signal is constituted by three kinds of primary Synchronization Signals and secondary Synchronization Signals constituted by 31 kinds of codes that are interleaved in the frequency domain. 504 patterns of cell identifiers (Physical Cell Identities; PCIs) for identifying base station devices, and frame timing for radio synchronization are indicated in combinations with the primary Synchronization Signals and the secondary Synchronization Signals. The terminal device identifies the Physical Cell ID of a received Synchronization Signal by cell search.

A Physical Broadcast Channel (PBCH) is transmitted for the purpose of announcing (configuring) a control parameter (broadcast information (System information)) commonly used among the terminal devices within the cell. The radio resource in which broadcast information is transmitted is announced on the Physical Downlink Control Channel to the terminal devices in the cell. Broadcast information not announced on the Physical Broadcast Information Channel is transmitted, as a layer-3 message (System information) for announcing the broadcast information on the Physical Downlink Shared Channel, by the announced radio resource.

As broadcast information, a Cell Global Identifier (CGI), which indicates a cell-specific identifier, a Tracking Area Identifier (TAI) for managing a standby area in paging, random access configuration information (such as a transmission timing timer), shared radio resource configuration information, neighboring cell information, and uplink access control information of the cell, and the like are announced.

A downlink Reference Signal is classified into multiple types according to its use. For example, Cell-specific RSs (cell-specific Reference Signals) are pilot signals transmitted with prescribed power from each cell and are downlink Reference Signals periodically repeated in the frequency domain and the time domain under a prescribed rule. The terminal device receives the Cell-specific RS and thereby measures the reception quality of each cell. The terminal device also uses a Cell-specific RS as a Reference Signal for demodulation of a Physical Downlink Control Channel or a Physical Downlink Shared Channel transmitted at the same time as a Cell-specific RS. A sequence used for a Cell-specific RS is a sequence distinguishable among the cells.

The downlink Reference Signal is also used for estimation of downlink channel variation. A downlink Reference Signal used for estimation of channel variations is referred to as a "Channel State Information Reference Signal (CSI-RS)". A downlink Reference Signal individually configured for the terminal device is referred to as a "UE-specific Reference Signals (URS), a Demodulation Reference Signal (DMRS), or a Dedicated RS (DRS)", and is referred to for a channel compensation process for demodulating an Enhanced Physical Downlink Control Channel or a Physical Downlink Shared Channel.

A Physical Downlink Control Channel (PDCCH) is transmitted by using the first several OFDM symbols (e.g., 1 to 4 OFDM symbols) of each subframe. The Enhanced Physical Downlink Control Channel (EPDCCH) is a Physical Downlink Control Channel allocated to the OFDM symbols to which the Physical Downlink Shared Channel (PDSCH) is allocated. The PDCCH or EPDCCH is used for notifying each terminal device of radio resource allocation information according to scheduling determined by the base station device and information indicating an adjustment amount for an increase or decrease in transmit power. In the following, even when the Physical Downlink Control Channel (PDCCH) alone is described, both physical channels that is, the PDCCH and the EPDCCH, are included unless otherwise noted.

The terminal device needs to monitor a Physical Downlink Control Channel addressed to the terminal device itself, and receive the Physical Downlink Control Channel addressed to the terminal device itself, before transmitting and receiving downlink data or a layer-2 message or layer-3 message, which is higher-layer control information (such as a paging or handover command), and thereby acquire, from the Physical Downlink Control Channel, radio resource allocation information called an uplink grant in a case of transmission and a downlink grant (downlink assignment) in a case of reception. Note that it is also possible to constitute the Physical Downlink Control Channel so that the Physical Downlink Control Channel is to be transmitted in the dedicated resource block domain allocated to each terminal device by the base station device, instead of transmission through OFDM symbols described above.

The Physical Uplink Control Channel (PUCCH) is used for an acknowledgment in response to reception of downlink data transmitted on the Physical Downlink Shared Channel (HARQ-ACK; Hybrid Automatic Repeat Request-Acknowledgment or ACK/NACK; Acknowledgment/Negative Acknowledgment), downlink channel (channel state) information (CSI: Channel State Information), and uplink radio resource allocation request (radio resource request, Scheduling Request (SR)).

The CSI includes a Channel Quality Indicator (CQI) of a Serving cell corresponding to the CSI, a Precoding Matrix Indicator (PMI), a Precoding Type Indicator (PTI), and a Rank Indication (RI), which can be used respectively for specifying (representing) a preferable modulation scheme and coding rate, a preferable precoding matrix, a preferable PMI type, and a preferable rank. Indication may be used as a notation for each Indicator. Moreover, the CQI and the PMI are classified into a wideband CQI and PMI assuming transmission using all the resource blocks in a single cell and a subband CQI and PMI assuming transmission using some contiguous resource blocks (subbands) in a single cell. Moreover, the PMI may be a type of PMI that represents a single preferable precoding matrix by using two kinds of PMIs, a first PMI and a second PMI, in addition to a normal type of PMI, which represents a single preferable precoding matrix by using a single PMI.

For example, a terminal device 1 reports a CQI index satisfying a condition that an error probability of a single PDSCH transport, which occupies a group of downlink physical resource blocks and is decided by a combination of modulation scheme and transport block size corresponding to the CQI index, does not exceed a prescribed value (e.g., 0.1).

The downlink physical resource block used for calculation of CQI, PMI, and/or RI is referred to as a "CSI reference resource".

The terminal device 1 reports the CSI to a base station device 2. The CSI reporting includes periodic CSI reporting and aperiodic CSI reporting. In periodic CSI reporting, the terminal device 1 reports the CSI at a timing configured by the higher layer. In aperiodic CSI reporting, the terminal device 1 reports the CSI at a timing based on information of a CSI request included in a received uplink DCI format (uplink grant) or random access response grant.

The terminal device 1 reports the CQI and/or the PMI and/or the RI. Note that the terminal device 1 may not report the PMI and/or the RI depending on the configuration by the higher layer. Examples of the configuration by the higher layer include a parameter regarding a transmission mode, a feedback mode, a reporting type, and whether to report the PMI/RI.

In the terminal device 1, one or more CSI processes may be configured for a single Serving cell. The CSI process is configured in association with the CSI reporting. A single CSI process is associated with a single CSI-RS resource and a single CSI-IM resource.

The Physical Downlink Shared Channel (PDSCH) is also used to notify the terminal device of a response to a random access (random access response, RAR), paging, or broadcast information (System information) that is not notified on the Physical Broadcast Information Channel, in addition to the downlink data, as a layer-3 message. The radio resource allocation information on the Physical Downlink Shared Channel is indicated by the Physical Downlink Control Channel. The Physical Downlink Shared Channel is allocated to OFDM symbols other than the OFDM symbols used to transmit a Physical Downlink Control Channel and is transmitted. In other words, the Physical Downlink Shared Channel and the Physical Downlink Control Channel are time division multiplexed in a single subframe.

The Physical Uplink Shared Channel (PUSCH) mainly transmits uplink data and uplink control information and may also transmit information including uplink control information such as CSI and ACK/NACK. Moreover, the Physical Uplink Shared Channel is also used by the terminal device to notify the base station device of the layer-2 message and layer-3 message, which are higher-layer control information, in addition to uplink data. The radio resource allocation information on the Physical Uplink Shared Channel is indicated by the Physical Downlink Control Channel, as in a case of downlink.

The Uplink Reference Signal (also referred to as an "uplink pilot signal" or an "uplink pilot channel") includes a Demodulation Reference Signal (DMRS) to be used by the base station device to demodulate the Physical Uplink Control Channel PUCCH and/or Physical Uplink Shared Channel PUSCH, and a Sounding Reference Signal (SRS) to be mainly used by the base station device to estimate an uplink channel state. Moreover, the Sounding Reference Signals are categorized into a Periodic Sounding Reference Signal (Periodic SRS), which is transmitted periodically, or an Aperiodic Sounding Reference Signal (Aperiodic SRS), which is transmitted when transmission is instructed by the base station device.

A Physical Random Access Channel (PRACH) is a channel used to announce (configure) a preamble sequence with a guard time. The preamble sequence is constituted so that the base station device is notified of the information with multiple sequences. For example, when 64 sequences are available, 6-bit information can be provided to the base station device. The Physical Random Access Channel is used by the terminal device as a means for accessing the base station device.

The terminal device uses the Physical Random Access Channel to request an uplink radio resource when no Physical Uplink Control Channel is configured for an SR or to request the base station device for transmission timing adjustment information (also referred to as a "Timing Advance (TA) command") necessary for matching uplink transmission timing to a reception timing window of the base station device, for example. Moreover, the base station device can request the terminal device to start a random access procedure, by using the Physical Downlink Control Channel.

A random access response is response information transmitted from the base station device in response to a random access by the terminal device. The random access response is transmitted from the base station device through the PDSCH scheduled by the control information of the PDCCH which has a CRC scrambled by an RA-RNTI. The random access response includes the transmission timing adjustment information, the uplink grant (the uplink grant included in the random access response is also referred to as a "random access response grant"), and information of a Temporary C-RNTI which is a temporary identifier of a terminal device.

The layer-3 message is a message exchanged between the RRC (radio resource control) layers of the terminal device and the base station device and handled in a protocol for a Control-plane (C-plane), and may be used as a synonym of RRC signaling or RRC message. A protocol handling user data (uplink data and downlink data) is referred to as a "User-plane (UP (U-plane))" in contrast to the "Control-plane". Here, a transport block which is transmission data in the physical layer, includes C-plane messages and U-plane data in the higher layers. Detailed description of other physical channels is omitted.

A communicable range (communication area) at each frequency controlled by the base station device is assumed to be a cell. Here, the communication area covered by the base station device may be different in size and shape for each frequency. Moreover, the covered area may be different for each frequency. A radio network in which the cells controlled by different types of base station devices and having different cell radii coexist in the area on the same frequency and/or different frequencies to form a single communication system, is referred to as a "heterogeneous network".

The terminal device operates by assuming the inside of a cell as a communication area. When the terminal device moves from a cell to a different cell, the terminal device moves to an appropriate different cell through a cell reselection procedure in a case of having no radio connection (during no communication) and through a handover procedure in a case of having radio connection (during communication). A suitable cell is in general a cell that is determined that access from the terminal device is not prohibited based on information specified by the base station device and that has a downlink reception quality satisfying a prescribed condition.

Moreover, the terminal device and the base station device may employ a technique for aggregating the frequencies (component carriers or frequency band) of multiple different frequency bands through carrier aggregation and treating the resultant as a single frequency (frequency band). A component carrier includes an uplink component carrier corresponding to the uplink and a downlink component carrier corresponding to the downlink. In this specification, "frequency" and "frequency band" may be used as synonyms.

For example, when five component carriers each having a frequency bandwidth of 20 MHz are aggregated through carrier aggregation, a terminal device capable of carrier aggregation performs transmission and reception by assuming that the aggregated carriers have a frequency bandwidth of 100 MHz. Note that component carriers to be aggregated may have contiguous frequencies or frequencies some or all of which are discontiguous. For example, assuming that available frequency bands are a band of 800 MHz, a band of 2 GHz, and a band of 3.5 GHz, a component carrier may be transmitted in a band of 800 MHz, another component carrier may be transmitted in a band of 2 GHz, and yet another component carrier may be transmitted in a band of 3.5 GHz.

It is also possible to aggregate multiple contiguous or discontiguous component carriers of the same frequency band. The frequency bandwidth of each component carrier may be narrower (e.g., 5 MHz or 10 MHz) than the receivable frequency bandwidth (e.g., 20 MHz) of the terminal device, and the frequency bandwidths of component carriers to be aggregated may be different from each other. Each frequency bandwidth is preferably equal to any of the frequency bandwidths of cells of the related art in consideration of backward compatibility but may be a frequency bandwidth different from any of the frequency bands of cells of the related art.

Moreover, component carriers (carrier types) without the backward compatibility may be aggregated. Note that the number of uplink component carriers to be allocated to (configured for or added for) the terminal device by the base station device is preferably the same as or fewer than the number of downlink component carriers.

A cell constituted of an uplink component carrier in which an uplink control channel is configured for a radio resource request and a downlink component carrier having a cell-specific connection with the uplink component carrier is referred to as a "Primary cell (PCell)". A cell constituted of component carriers other than those of the Primary cell is referred to as a "Secondary cell (SCell)". The terminal device receives a paging message, detects update of the broadcast information, carries out an initial access procedure, configures security information, and the like in a Primary cell, and need not perform these operations in Secondary cells.

Although the Primary cell is not a target of Activation and Deactivation controls (in other words, considered as being activated at any time), the Secondary cell has activated and deactivated states, the change of which is explicitly specified by the base station device or is made based on a timer configured for the terminal device for each component carrier. The Primary cell and Secondary cell are collectively referred to as a "Serving cell".

The carrier aggregation is communication using multiple component carriers (frequency bands) by multiple cells and is also referred to as "cell aggregation". The terminal device may have radio connection with the base station device via a relay station device (or repeater) for each frequency. In other words, the base station device of the present embodiment may be replaced with a relay station device.

The base station device manages a cell, which is an area where terminal devices can communicate with the base station device, for each frequency. A single base station device may manage multiple cells. The cells are classified into multiple types of cells depending on the sizes of the areas (cell size) that allow communication with terminal devices. For example, the cells are classified into macro cells and small cells. Moreover, the small cells are classified into femto cells, pico cells, and nano cells depending on the sizes of the areas. When a terminal device can communicate with a certain base station device, the cell configured so as to be used for the communication with the terminal device is referred to as a "Serving cell" while the other cells not used for the communication are referred to as a "Neighboring cell", among the cells of the base station device.

In other words, in carrier-aggregation (also referred to as "carrier aggregation"), multiple Serving cells thus configured include a single Primary cell and one or more Secondary cells.

The Primary cell is a Serving cell in which an initial connection establishment procedure has been carried out, a Serving cell in which a connection re-establishment procedure has been started, or a cell indicated as a Primary cell during a handover procedure. Operation at a primary frequency is performed in the Primary cell. At the point of time when a connection is (re)established, or later, a Secondary cell may be configured. Operation at a secondary frequency is performed in each Secondary cell. The connection may be referred to as an "RRC connection". For the terminal device supporting the CA, a single Primary cell and one or more Secondary cells are aggregated.

In the present embodiment, Licensed Assisted Access (LAA) is used. In the LAA, a Licensed spectrum is configured (used) for the Primary cell, and an Unlicensed spectrum is configured for at least one of the Secondary cells. The Secondary cell for which the Unlicensed spectrum is configured is assisted by the Primary cell or Secondary cell for which the Licensed spectrum is configured. For example, configuration and/or notification of the control information by RRC signaling, MAC signaling, and/or PDCCH signaling is performed from the Primary cell or Secondary cell for which the Licensed spectrum is configured to the Secondary cell for which the Unlicensed spectrum is configured. In the present embodiment, the cell assisted by the Primary cell or Secondary cell is also referred to as an "LAA cell". The LAA cell can be aggregated with (assisted by) the Primary cell and/or the Secondary cell by the carrier aggregation. The Primary cell or Secondary cell assisting the LAA cell is also referred to as an "assist cell".

The LAA cell may be aggregated with (assisted by) the Primary cell and/or the Secondary cell through dual connectivity.

A basic configuration (architecture) of the dual connectivity will be described below. A description is given of a case that the terminal device 1 connects to multiple base stations 2 (e.g., a base station device 2-1 and a base station device 2-2) at the same time, for example. Assume that the base station device 2-1 is a base station device constituting a macro cell, and the base station device 2-2 is a base station device constituting a small cell. The terminal device 1 connecting to the base station devices 2 at the same time by using the multiple cells belonging to the multiple base station devices 2 as described above is referred to as "dual connectivity". The cells belonging to the respective base station devices 2 may be operated at the same frequency or different frequencies.

Note that the carrier aggregation is different from the dual connectivity in that a single one of the base station devices 2 manages multiple cells and the frequencies of the respective cells are different from each other. In other words, the carrier aggregation is a technique for connecting the single terminal device 1 and a single one of the base station devices 2 via multiple cells having different frequencies, while the dual connectivity is a technique for connecting the single terminal device 1 and the multiple base station devices 2 via multiple cells having the same frequency or different frequencies.

The terminal device 1 and the base station devices 2 can apply a technique used for the carrier aggregation, to the dual connectivity. For example, the terminal device 1 and the base station devices 2 may apply a technique of allocation of a Primary cell and Secondary cells or Activation/Deactivation, to the cells connected through the dual connectivity.

The base station device 2-1 or the base station device 2-2 is connected to an MME and an SGW via a backbone network. The MME is a host control station device corresponding to a Mobility Management Entity (MME) and has the functions of managing mobility and performing authentication control (security control) for the terminal device 1, and configuring routes for the user data to the base station devices 2. The SGW is a host control station device corresponding to a Serving Gateway (S-GW) and has the functions of transmitting the user data according to the route for the user data to the terminal device 1 configured by the MME.

Moreover, the connection route between the base station device 2-1 or base station device 2-2 and the SGW through the dual connectivity is referred to as an "SGW interface". The connection route between the base station device 2-1 or base station device 2-2 and the MME is referred to as an "MME interface". The connection route between the base station device 2-1 and the base station device 2-2 is referred to as a "base station interface". The SGW interface is also referred to as an "S1-U interface" in the EUTRA. The MME interface is also referred to as an "S1-MME interface" in the EUTRA. The base station interface is also referred to as an "X2 interface" in the EUTRA.

An example of an architecture for enabling the dual connectivity is described. In the dual connectivity, the base station device 2-1 and the MME are connected via the MME interface. Moreover, the base station device 2-1 and the SGW are connected via the SGW interface. The base station device 2-1 provides, to the base station device 2-2, the communication route to the MME and/or SGW via the base station interface. In other words, the base station device 2-2 is connected to the MME and/or the SGW via the base station device 2-1.

Moreover, another example of another architecture for enabling the dual connectivity is described. In the dual connectivity, the base station device 2-1 and the MME are connected via the MME interface. The base station device 2-1 and the SGW are connected via the SGW interface. The base station device 2-1 provides, to the base station device 2-2, the communication route to the MME via the base station interface. In other words, the base station device 2-2 is connected to the MME via the base station device 2-1. The base station device 2-2 is connected to the SGW via the SGW interface.

Note that a constitution in which the base station device 2-2 and the MME are directly connected via the MME interface may be employed.

On the basis of description from a different point of view, the dual connectivity is an operation whereby a prescribed terminal device consumes radio resources provided from at least two different network points (a master base station device (MeNB: Master eNB) and a secondary base station device (SeNB: Secondary eNB)). In other words, in the dual connectivity, the terminal device is configured to establish an RRC connection to at least two network points. In the dual connectivity, the terminal device may be connected via a non-ideal backhaul in an RRC CONNECTED state.

In the dual connectivity, the base station device that is connected to at least the S1-MME and that serves as a mobility anchor of a core network is referred to as a "master base station device". Moreover, the base station device that is not the master base station device and that provides supplemental radio resources to the terminal device is referred to as a "secondary base station device". A group of Serving cells that is associated with the master base station device may be referred to as a "Master Cell Group (MCG)", and a group of Serving cells that is associated with the secondary base station device may be referred to as a "Secondary Cell Group (SCG)". Note that the cell groups may be serving cell groups.

In the dual connectivity, the Primary cell belongs to the MCG. Moreover, in the SCG, the Secondary cell that corresponds to the Primary cell is referred to as a "Primary Secondary Cell" (pSCell). Note that the pSCell may be referred to as a "special cell" or a "Special Secondary Cell (Special SCell)". Some of the functions (e.g., functions for transmitting and receiving a PUCCH) of the PCell (the base station device constituting the PCell) may be supported by the Special SCell (the base station device constituting the Special SCell). Additionally, only some of the functions of the PCell may be supported in the pSCell. For example, the function for transmitting a PDCCH may be supported in the pSCell. Additionally, the function for performing a PDCCH transmission may be supported in the pSCell using a search space different from a common search space (CSS) or UE-specific search space (USS). For example, the search space different from the USS is a search space determined based on a value defined in the specification, a search space determined based on an RNTI different from the C-RNTI, a search space determined based on a value configured by the higher layer that is different from the RNTI, or the like. Moreover, the pSCell may constantly be in a starting state. The pSCell is a cell capable of receiving the PUCCH.

In the dual connectivity, a Data Radio Bearer (DRB) may be individually allocated to the MeNB and the SeNB. On the other hand, a Signaling Radio Bearer (SRB) may be allocated only to the MeNB. In the dual connectivity, a duplex mode may be configured individually for the MCG and the SCG or the PCell and the pSCell. In the dual connectivity, the MCG and the SCG or the PCell and the pSCell need not necessarily be synchronized with each other. In the dual connectivity, multiple parameters for timing adjustment (TAG or Timing Advance Group) may be configured for each of the MCG and the SCG In other words, the terminal device is capable of performing uplink transmission at the multiple different timings in each CG.

In the dual connectivity, the terminal device is allowed to transmit UCI corresponding to the cells in the MCG only to the MeNB (the PCell) and to transmit UCI corresponding to the cells in the SCG only to the SeNB (the pSCell). For example, the UCI is an SR, HARQ-ACK, and/or CSI. Additionally, in each UCI transmission, a transmission method using the PUCCH and/or the PUSCH is applied to each cell group.

All signals can be transmitted and received in the Primary cell, but some signals may not be transmitted and received in the Secondary cell. For example, the Physical Uplink Control Channel (PUCCH) is transmitted only in the Primary cell. Additionally, unless multiple Timing Advance Groups (TAGs) are configured between the cells, a Physical Random Access Channel (PRACH) is transmitted only in the Primary cell. Additionally, a Physical Broadcast Channel (PBCH) is transmitted only in the Primary cell. Additionally, a Master Information Block (MIB) is transmitted only in the Primary cell. Signals that can be transmitted and received in the Primary cell are transmitted and received in the Primary Secondary cell. For example, the PUCCH may be transmitted in the Primary Secondary cell. Additionally, the PRACH may be transmitted in the Primary Secondary cell, regardless of whether the multiple TAGs are configured. Additionally, the PBCH and the MIB may be transmitted in the Primary Secondary cell.

In the Primary cell, a Radio Link Failure (RLF) is detected. In the Secondary cell, even in a case where conditions for the detection of the RLF are in place, the detection of the RLF is not recognized. However, in the Primary Secondary cell, the RLF is detected in a case where the conditions are in place. When the RLF is detected in the Primary Secondary cell, the higher layer of the Primary Secondary cell notifies the higher layer of the Primary cell of that the RLF has been detected. Semi-Persistent Scheduling (SPS) or Discontinuous Reception (DRX) may be performed in the Primary cell. The same DRX as in the Primary cell may be performed in the Secondary cell. Fundamentally, in the Secondary cell, the MAC configuration information/parameters are shared with the Primary cell/Primary Secondary cell of the same cell group. Some of the parameters (e.g., sTAG-Id) may be configured for each Secondary cell. Some of the timers or counters may be applied only to the Primary cell and/or the Primary Secondary cell. A timer or counter to be applied may be configured only in the Secondary cell.

In an example of a case that the dual connectivity is applied to the LAA cell, the MCG (base station device 2-1) is a base station device constituting the Primary cell, and the SCG (base station device 2-2) is a base station device constituting the LAA cell. Specifically, the LAA cell is configured as the pSCell of the SCG In another example of the case that the dual connectivity is applied to the LAA cell, the MCG is a base station device constituting the Primary cell, and the SCG is a base station device constituting the pSCell and LAA cell. Specifically, the LAA cell is assisted by the pSCell in the SCG. Note that when a Secondary cell is further configured in the SCG, the LAA cell may be assisted by the Secondary cell.

In another example of the case that the dual connectivity is applied to the LAA cell, the MCG is a base station device constituting the Primary cell and LAA cell, and the SCG is a base station device constituting the pSCell. Specifically, the LAA cell is assisted by the Primary cell in the MCG Note that when a Secondary cell is further configured in the MCG, the LAA cell may be assisted by the Secondary cell.

Figure 3:
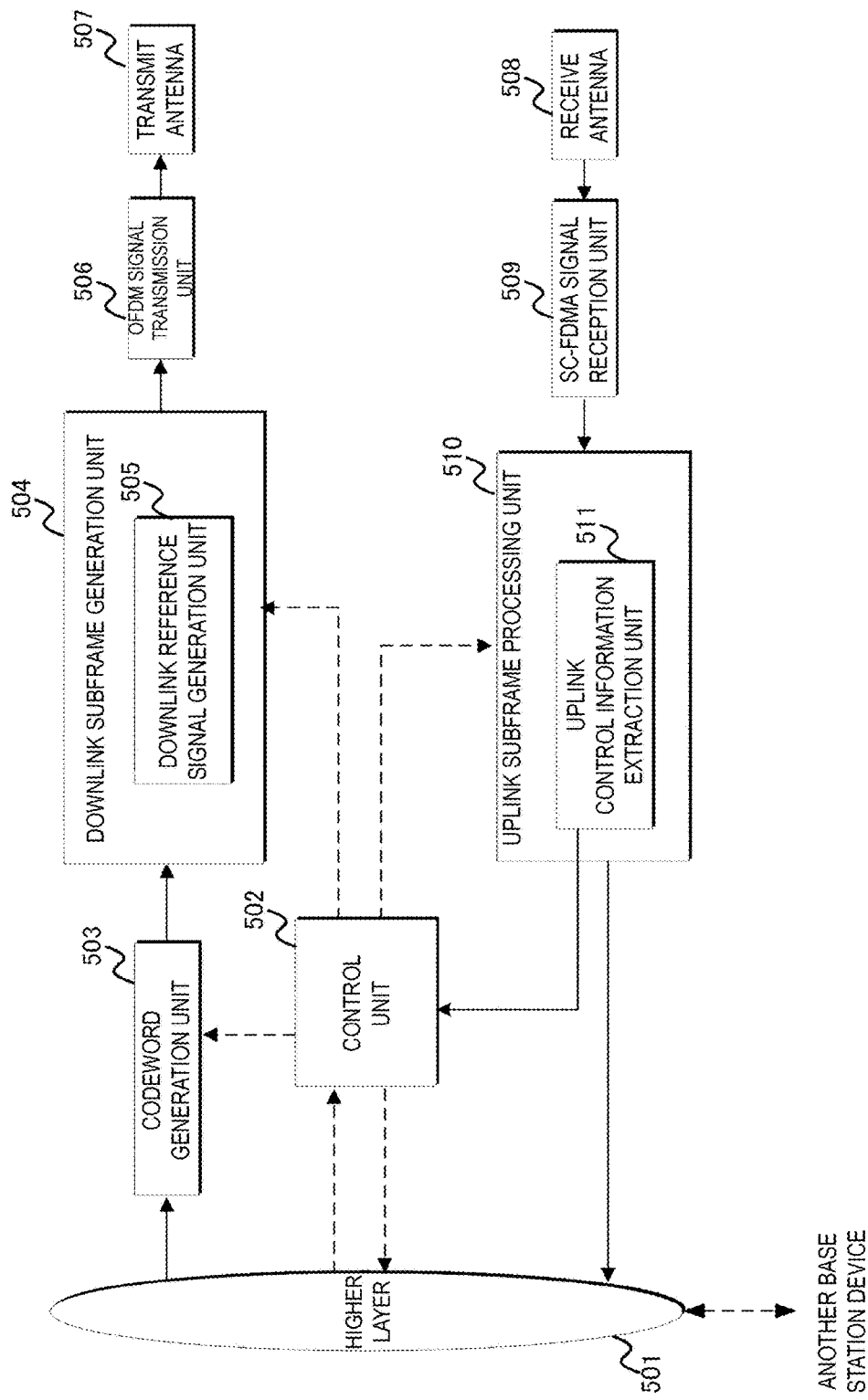
FIG. 3 is a schematic diagram illustrating an example of a block configuration of a base station device 2 according to the present embodiment.

FIG. 3 is a schematic diagram illustrating an example of a block configuration of the base station device 2 according to the present embodiment. The base station device 2 includes a higher layer (higher-layer control information notification unit, higher layer processing unit) 501, a control unit (base station control unit) 502, a codeword generation unit 503, a downlink subframe generation unit 504, an OFDM signal transmission unit (downlink transmission unit) 506, a transmit antenna (base station transmit antenna) 507, a receive antenna (base station receive antenna) 508, an SC-FDMA signal reception unit (CSI reception unit) 509, and an uplink subframe processing unit 510. The downlink subframe generation unit 504 includes a downlink Reference Signal generation unit 505. Moreover, the uplink subframe processing unit 510 includes an uplink control information extraction unit (CSI acquisition unit) 511.

Figure 4:
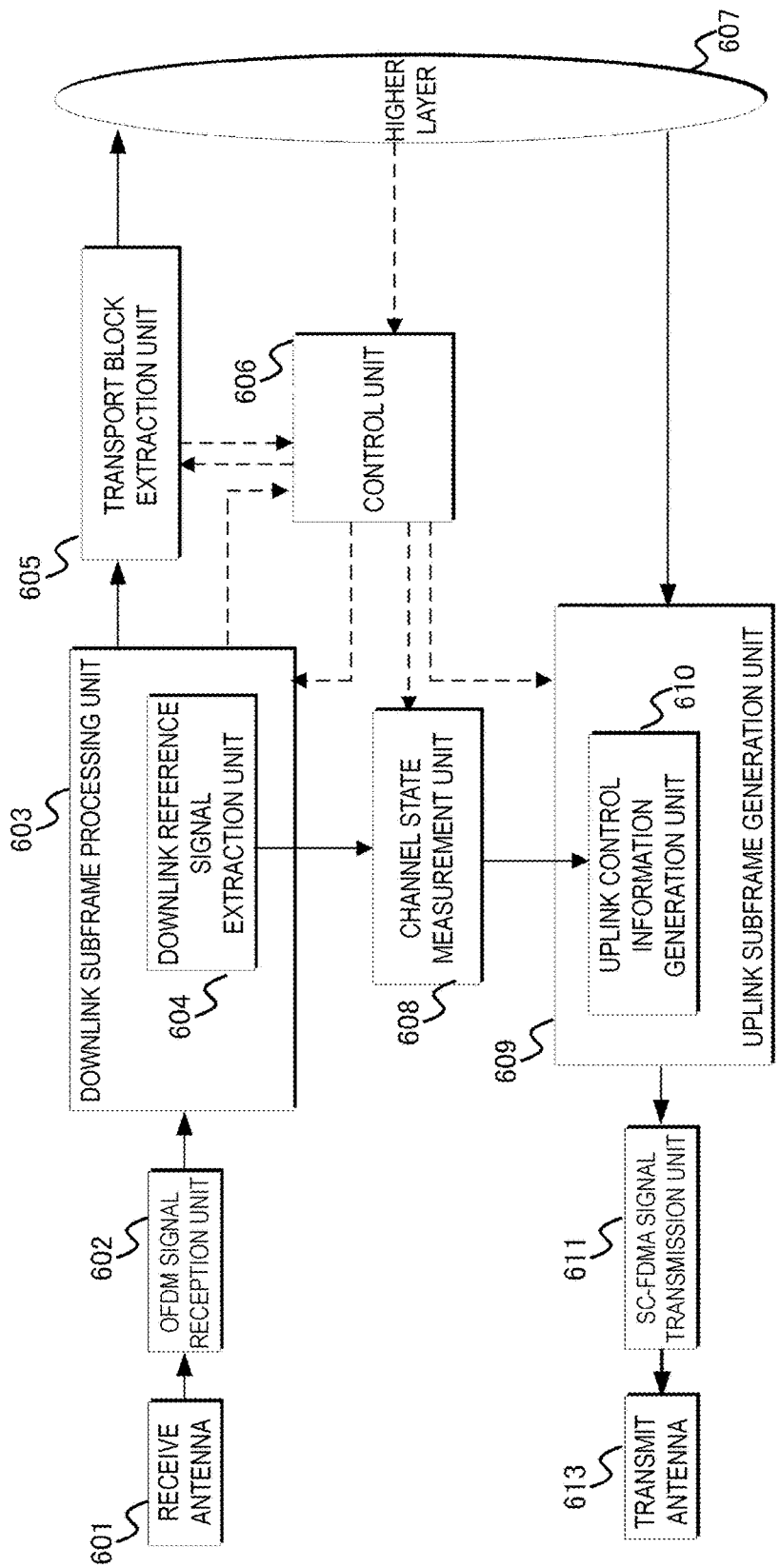
FIG. 4 is a schematic diagram illustrating an example of a block configuration of a terminal device 1 according to the present embodiment.

FIG. 4 is a schematic diagram illustrating an example of a block configuration of the terminal device 1 according to the present embodiment. The terminal device 1 includes a receive antenna (terminal receive antenna) 601, an OFDM signal reception unit (downlink reception unit) 602, a downlink subframe processing unit 603, a transport block extraction unit (data extraction unit) 605, a control unit (terminal control unit) 606, a higher layer (higher-layer control information acquisition unit, higher layer processing unit) 607, a channel state measurement unit (CSI generation unit) 608, an uplink subframe generation unit 609, SC-FDMA signal transmission units (UCI transmission units) 611 and 612, and transmit antennas (terminal transmit antennas) 613 and 614. The downlink subframe processing unit 603 includes a downlink Reference Signal extraction unit 604. Moreover, the uplink subframe generation unit 609 includes an uplink control information generation unit (UCI generation unit) 610.

First, a flow of downlink data transmission and reception will be described with reference to FIG. 3 and FIG. 4. In the base station device 2, the control unit 502 holds a Modulation and Coding Scheme (MCS) indicating a modulation scheme, a coding rate, and the like in the downlink, downlink resource allocation indicating RBs to be used for data transmission, and information to be used for HARQ control (a Redundancy Version, an HARQ process number, and a new data indicator) and controls the codeword generation unit 503 and downlink subframe generation unit 504 based on these elements. The downlink data (also referred to as a downlink transport block) transmitted from the higher layer 501 is processed through error correction coding, rate matching, and the like in the codeword generation unit 503 under the control of the control unit 502 and then, a codeword is generated. Two codewords at maximum are transmitted at the same time in a single subframe of a single cell. In the downlink subframe generation unit 504, a downlink subframe is generated in accordance with an instruction from the control unit 502. First, a codeword generated in the codeword generation unit 503 is converted into a modulation symbol sequence through a modulation process, such as Phase Shift Keying (PSK) modulation or Quadrature Amplitude Modulation (QAM). Moreover, the modulation symbol sequence is mapped to the REs in some RBs, and a downlink subframe for each antenna port is generated through a precoding process. In this operation, a transmission data sequence transmitted from the higher layer 501 includes higher-layer control information, which is control information on the higher layer (e.g., dedicated (individual) Radio Resource Control (RRC) signaling). Moreover, in the downlink Reference Signal generation unit 505, a downlink Reference Signal is generated. The downlink subframe generation unit 504 maps the downlink Reference Signal to the REs in the downlink subframes in accordance with an instruction from the control unit 502. The downlink subframe generated in the downlink subframe generation unit 504 is modulated to an OFDM signal in the OFDM signal transmission unit 506 and then transmitted via the transmit antenna 507. Although a configuration of including one OFDM signal transmission unit 506 and one transmit antenna 507 is provided as an example here, a configuration of including multiple OFDM signal transmission units 506 and transmit antennas 507 may be employed when downlink subframes are transmitted on multiple antenna ports. Moreover, the downlink subframe generation unit 504 may also have the capability of generating physical-layer downlink control channels, such as a PDCCH and an EPDCCH, to map the channels to the REs in downlink subframes. The multiple base station devices (base station device 2-1 and base station device 2-2) transmit separate downlink subframes.

In the terminal device 1, an OFDM signal is received by the OFDM signal reception unit 602 via the receive antenna 601, and an OFDM demodulation process is performed on the signal. The downlink subframe processing unit 603 first detects physical-layer downlink control channels, such as a PDCCH and an EPDCCH. More specifically, the downlink subframe processing unit 603 decodes the signal by assuming that a PDCCH and an EPDCCH have been transmitted in the regions to which the PDCCH and the EPDCCH can be allocated, and checks Cyclic Redundancy Check (CRC) bits added in advance (blind decoding). In other words, the downlink subframe processing unit 603 monitors a PDCCH and an EPDCCH. When the CRC bits match an ID (a single terminal-specific identifier assigned to a single terminal, such as a Cell-Radio Network Temporary Identifier (C-RNTI) or a Semi-Persistent Scheduling-C-RNTI (SPS-C-RNTI), or a Temporaly C-RNTI) assigned by the base station device in advance, the downlink subframe processing unit 603 recognizes that a PDCCH or an EPDCCH has been detected and extracts a PDSCH by using control information included in the detected PDCCH or EPDCCH. The control unit 606 holds an MCS indicating a modulation scheme, a coding rate, and the like in the downlink based on the control information, downlink resource allocation indicating RBs to be used for downlink data transmission, and information to be used for HARQ control, and controls the downlink subframe processing unit 603, the transport block extraction unit 605, and the like based on these elements. More specifically, the control unit 606 performs control so as to carry out an RE mapping process in the downlink subframe generation unit 504, an RE demapping process and demodulation process corresponding to the modulation process, and the like. The PDSCH extracted from the received downlink subframe is transmitted to the transport block extraction unit 605. The downlink Reference Signal extraction unit 604 in the downlink subframe processing unit 603 extracts the downlink Reference Signal from the downlink subframe. In the transport block extraction unit 605, a rate matching process, a rate matching process corresponding to error correction coding, error correction decoding, and the like in the codeword generation unit 503 are carried out, and a transport block is extracted and transmitted to the higher layer 607. The transport block includes the higher-layer control information, and the higher layer 607 notifies the control unit 606 of a necessary physical-layer parameter based on the higher-layer control information. The multiple base station devices 2 (base station device 2-1 and base station device 2-2) transmit separate downlink subframes, and the terminal device 1 receives the downlink subframes. Hence, the above-described processes may be carried out for the downlink subframe of each of the multiple base station devices 2. In this case, the terminal device 1 may recognize that multiple downlink subframes have been transmitted from the multiple base station devices 2, or need not recognize this. In a case that the terminal device 1 does not recognize the above, the terminal device 1 may simply recognize that multiple downlinks subframes have been transmitted from multiple cells. Moreover, the transport block extraction unit 605 determines whether the transport block has been detected correctly and transmits the determination result to the control unit 606.

Next, a flow of uplink signal transmission and reception will be described. In the terminal device 1, a downlink Reference Signal extracted by the downlink Reference Signal extraction unit 604 is transmitted to the channel state measurement unit 608 under the instruction from the control unit 606, the channel state and/or interference is measured in the channel state measurement unit 608, and further CSI is calculated based on the measured channel state and/or interference. The control unit 606 instructs the uplink control information generation unit 610 to generate an HARQ-ACK (DTX (not transmitted yet), ACK (detection succeeded), or NACK (detection failed)) and map the resultant to a downlink subframe based on the determination result of whether the transport block is correctly detected. The terminal device 1 performs these processes on the downlink subframe of each of multiple cells. In the uplink control information generation unit 610, a PUCCH including the calculated CSI and/or HARQ-ACK is generated. In the uplink subframe generation unit 609, the PUSCH including the uplink data transmitted from the higher layer 607 and the PUCCH generated by the uplink control information generation unit 610 are mapped to the RBs in an uplink subframe to generate an uplink subframe. The uplink subframe is subjected to the SC-FDMA modulation to generate an SC-FDMA signal, and the SC-FDMA signal is transmitted via the transmit antenna 613 by the SC-FDMA signal transmission unit 611.

Here, the terminal device 1 carries out (or derives) channel measurement in order to calculate a value of the CQI based on the CRS or the CSI-RS (non-zero-power CSI-RS).

Whether the terminal device 1 derives based on the CRS or the CSI-RS is switched by a higher-layer signal. Specifically, in the transmission mode where the CSI-RS is configured, the channel measurement is derived for calculating the CQI based on only the CSI-RS. Specifically, in the transmission mode where the CSI-RS is not configured, the channel measurement is derived for calculating the CQI based on the CRS. The RS used for the channel measurement for calculating the CSI is also referred to as a "first RS".

Here, the terminal device 1, in the case of the configuration by the higher layer, carries out (derives) interference measurement in order to calculate the CQI based on the CSI-IM or a second RS. Specifically, in the transmission mode where the CSI-IM is configured, the interference measurement is derived for calculating the CQI based on the CSI-IM. Specifically, in the transmission mode where the CSI-IM is configured, the interference measurement is derived for calculating a value of the CQI corresponding to the CSI process based on only the CSI-IM resource associated with the CSI process. The RS or IM used for the channel measurement for calculating the CSI is also referred to as the "second RS".

Note that the terminal device 1 may carry out (or derive) the interference measurement for calculating the CQI based on the CRS. For example, in the case that the CSI-IM is not configured, the interference measurement may be derived for calculating the CQI based on the CRS.

Note that the channel and/or interference for calculating the CQI may be similarly used as a channel and/or interference for calculating the PMI or RI.

The LAA cell is described in detail below.

Frequencies used by the LAA cell are shared by other communication systems and/or other LTE operators. In frequency sharing, fairness among the LAA cell and other communication systems and/or other LTE operators is needed. For example, a fair frequency sharing technique (method) is needed in a communication scheme used by the LAA cell. In other words, the LAA cell is a cell in which a communication scheme (communication procedure) to which the fair frequency sharing technique is applicable (or usable for) is performed.

An example of the fair frequency sharing technique is Listen-Before-Talk (LBT). In the LBT, before a base station or terminal transmits a signal using a frequency (component carrier, cell), an interference power of the frequency (interference signal, received power, received signal, noise power, noise signal) or the like is measured (or detected) to identify (detect, presume, or decide) whether the frequency is in an idle state (available state, not-congested state, Absence, Clear), or a busy state (unavailable state, congested state, Presence, Occupied). In a case that the frequency is identified as being in the idle state based on the LBT, the LAA cell can transmit a signal at the frequency at a prescribed timing. In a case that the frequency is identified as being in the busy state based on the LBT, the LAA cell does not transmit a signal at the frequency at a prescribed timing. The LBT makes it possible to control to not interfere the signals transmitted by other base stations and/or terminals including other communication systems and/or other LTE operators.

A procedure of the LBT is defined as a mechanism of applying Clear Channel Assessment (CCA) check before a base station or a terminal uses the frequency (channel). In the CCA, the power or signal is detected for deciding whether other signals are present on the channel in order to identify whether the frequency is in the idle state or the busy stat. Note that the definition of CCA may be equivalent to the definition of LBT in the present embodiment.

In the CCA, a method for deciding the presence/absence of other signals may include various methods. For example, in the CCA, the presence/absence of other signals is decided based on whether an interference power at a frequency exceeds a threshold. Moreover, for example, in the CCA, the presence/absence of other signals is decided based on whether a prescribed signal at a frequency or a received power on a channel exceeds a threshold. The threshold may be defined in advance. The threshold may be configured by the base station or other terminals. The threshold may be decided (configured) at least based on other value (parameter) such as a transmit power (maximum transmit power).

Note that the CCA in the LAA cell does not need to be recognized by the terminal connected (configured) to the LAA cell.

In a case that the terminal device 1 can detect transmission after the CCA in the LAA cell is completed, the terminal device 1 may presume that several subframes are contiguously transmitted after detecting the first transmission. The several contiguous subframes transmission is also referred to as "transmission burst". The number of subframes contiguously transmitted by the transmission burst may be configured to the terminal device 1 by use of the RRC message.

The LAA cell may be defined as a cell different from the Secondary cell where the Licensed spectrum is used. For example, the LAA cell is configured differently from the configuration of the Secondary cell where the Licensed spectrum is used. Some parameters configured to the LAA cell are not configured to the Secondary cell where the Licensed spectrum is used. Some parameters configured to the Secondary cell where the Licensed spectrum is used are not configured to the LAA cell. In the present embodiment, the LAA cell is described as a cell different from the Primary cell and Secondary cell, but the LAA cell may be defined as one of the Secondary cells. The Secondary cell of the related art is also referred to as a "first Secondary cell", and the LAA cell is also referred to as a "second Secondary cell". The Primary cell and Secondary cell of the related art are also referred to as a "first Serving cell", and the LAA cell is also referred to as a "second Serving cell".

The LAA cell may be different from the frame structure type of the related art. For example, in the Serving cell of the related art, a first frame structure type (FDD, frame structure type 1) or a second frame structure type (TDD, frame structure type 2) is used (configured), but in the LAA cell, a third frame structure type (frame structure type 3) is used (configured). Note that in the LAA cell, the first frame structure type or the second frame structure type may be used (configured).

Moreover, the third frame structure type is preferably a frame structure type having characteristics of a FDD cell, although the third frame structure type is for a TDD cell capable of uplink and downlink transmission at the same frequency. For example, the third frame structure type has an uplink subframe, a downlink subframe, and a special subframe, but an interval from receiving an uplink grant to transmitting a PUSCH scheduled from the uplink grant, or an interval from receiving a PDSCH to a HARQ feedback to the PDSCH may be similar to an interval in the FDD cell.

The third frame structure type is preferably a frame structure type not depending on TDD uplink/downlink configuration (TDD UL/DL configuration) of the related art. For example, the uplink subframe, the downlink subframe, and the special subframe may be aperiodically configured to a radio frame. For example, the uplink subframe, the downlink subframe, and the special subframe may be decided based on the PDCCH or EPDCCH.

Here, the Unlicensed spectrum is a frequency different from the Licensed spectrum allocated as a proprietary frequency to a prescribed operator. For example, the Unlicensed spectrum is a frequency used by a wireless LAN. For example, the Unlicensed spectrum is a frequency not configured in LTE of the related art, and the Licensed spectrum is a frequency configurable in LTE of the related art. In the present embodiment, the frequency configured in the LAA cell is described as the Unlicensed spectrum, but is not limited thereto. Specifically, the Unlicensed spectrum may be replaced with the frequency configured in the LAA cell. For example, the Unlicensed spectrum is a frequency not configurable in the Primary cell, but is a frequency configurable only in the Secondary cell. For example, the Unlicensed spectrum includes a frequency shared by multiple operators. For example, the Unlicensed spectrum is a frequency configured only to a cell which is subjected to a configuration, presumption and/or process different from those in the Primary cell or Secondary cell of the related art.

The LAA cell may be a cell where a scheme different from scheme of the related art is used concerning the configuration of a radio frame, a physical signal, and/or physical channel and the like and communication procedure in LTE.

For example, in the LAA cell, a prescribed signal and/or channel configured (transmitted) in the Primary cell and/or Secondary cell is not configured (transmitted). The prescribed signal and/or channel includes the CRS, DS, PDCCH, EPDCCH, PDSCH, PSS, SSS, PBCH, PHICH, PCFICH, CSI-RS and/or SIB, and the like. For example, signals and/or channels not configured in the LAA cell are as below. Note that the signal and/or channel described below may be used in combination. Note that in the present embodiment, the signal and/or channel not configured in the LAA cell may read as the signal and/or channel which the terminal does not expect transmission from the LAA cell.

(1) In the LAA cell, the control information in a physical layer is transmitted not on the PDCCH but only on the EPDCCH.

(2) In the LAA cell, even in a subframe in an activation state (ON), the CRS, DMRS, URS, PDCCH, EPDCCH and/or PDSCH are not transmitted at any of the subframes, and the terminal does not presume the transmission at every subframe.

(3) In the LAA cell, the terminal presumes that the DRS, PSS, and/or SSS is transmitted at the subframe in the activation state (ON).

(4) In the LAA cell, the terminal is notified of information on the mapping of the CRS for each subframe, and presumes the mapping of the CRS based on the information. For example, in the presumed mapping of the CRS, the CRS is not mapped to all the Resource Elements of the subframe. In the presumed mapping of the CRS, the CRS is not mapped to some of the Resource Elements of the subframe (e.g., all Resource Elements of the first 2 OFDM symbols). In the presumed mapping of the CRS, the CRS is mapped to all the Resource Elements of the subframe. For example, the information on the mapping of the CRS is notified from the LAA cell or a cell different from the LAA cell. The information on the mapping of the CRS is included in the DCI, and notified by the PDCCH or EPDCCH.

For example, in the LAA cell, a prescribed signal and/or channel not configured (transmitted) in the Primary cell and/or Secondary cell is configured (transmitted).

For example, in the LAA cell, only the downlink component carrier or subframe is defined to transmit only the downlink signal and/or channel. In other words, in the LAA cell, the uplink component carrier or subframe is not defined and the uplink signal and/or channel is not transmitted.

Moreover, for example, a Downlink Control Information (DCI) format compliant with the LAA cell is different from a DCI format compliant with the Primary cell and/or Secondary cell. The DCI format compliant with only the LAA cell is defined. The DCI format compliant with the LAA cell includes the control information effective only in the LAA cell.

For example, in the LAA cell, presumption of the signal and/or channel is different from those in the Secondary cell of the related art.

First, the presumption of the signal and/or channel in the Secondary cell of the related art is described. The terminal satisfying some or all of conditions below presumes that the PSS, SSS, PBCH, CRS, PCFICH, PDSCH, PDCCH, EPDCCH, PHICH, DMRS and/or CSI-RS may not be transmitted by the Secondary cell except for the DS transmission. The terminal presumes that the DS is always transmitted by the Secondary cell. The presumption is continued until a subframe at which an activation command (a command for activation) is received by the terminal in the Secondary cell at a certain carrier frequency.

(1) The terminal supports the configuration (parameter) concerning the DS.

(2) RRM measurement based on the DS is configured to the terminal in the Secondary cell.

(3) The Secondary cell is in a deactivation state (deactivated state).

(4) The terminal is not configured to receive MBMS by the higher layer in the Secondary cell.

In a case that the Secondary cell is in the activation state (activated state), the terminal presumes that the PSS, SSS, PBCH, CRS, PCFICH, PDSCH, PDCCH, EPDCCH, PHICH, DMRS and/or CSI-RS are transmitted at the configured prescribed subframes or all of the subframes by the Secondary cell.

Next, an example of the presumption of the signal and/or channel in the LAA cell is described. The terminal satisfying some or all of conditions below presumes that transmission of the PSS, SSS, PBCH, CRS, PCFICH, PDSCH, PDCCH, EPDCCH, PHICH, DMRS and/or CSI-RS as well as the DS transmission may not be performed by LAA cell. The presumption is continued until a subframe at which an activation command (a command for activation) is received by the terminal in the Secondary cell at a certain carrier frequency.

(1) The terminal supports the configuration (parameter) concerning the DS.

(2) RRM measurement based on the DS is configured to the terminal in the LAA cell.

(3) The LAA cell is in a deactivation state (deactivated state).

(4) The terminal is not configured to receive MBMS by the higher layer in the LAA cell.

Furthermore, another example of the presumption of the signal and/or channel in the LAA cell is described. In a case that the LAA cell is in the deactivation (deactivated state), the presumption of the signal and/or channel in the LAA cell is the same as the presumption of the signal and/or channel in the Secondary cell of the related art. In a case that the LAA cell is in the activation (activated state), the presumption of the signal and/or channel in the LAA cell is different from the presumption of the signal and/or channel in the Secondary cell of the related art. For example, in the case that the LAA cell is in the activation state (activated state), the terminal presumes that the PSS, SSS, PBCH, CRS, PCFICH, PDSCH, PDCCH, EPDCCH, PHICH, DMRS and/or CSI-RS may not be transmitted by the LAA cell at a subframe other than the prescribed subframes configured by the LAA cell. Details thereof is described later.

Next, a communication procedure in the LAA cell is described in detail.

Figure 5:
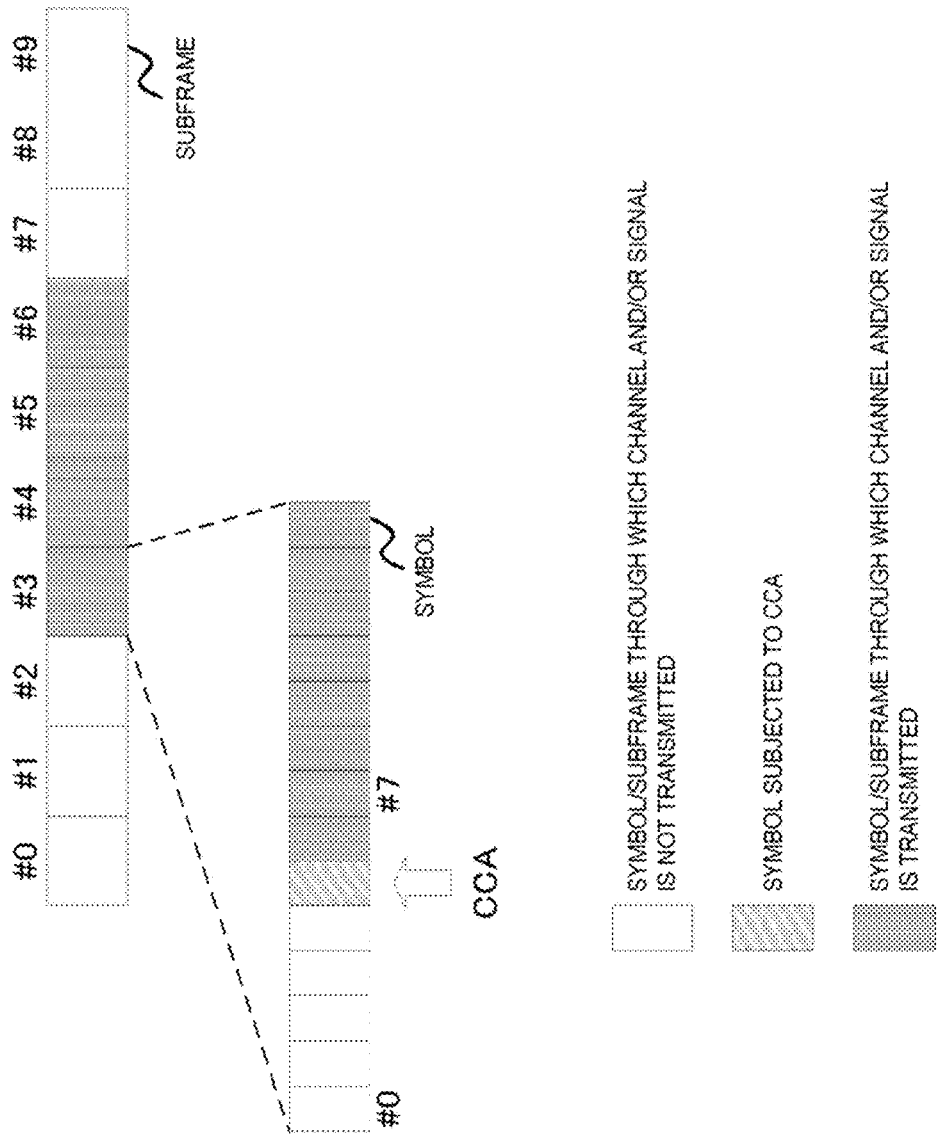
FIG. 5 is a diagram illustrating an example of a communication procedure in a LAA cell according to the present embodiment.

FIG. 5 is a diagram illustrating an example of a communication procedure in an LAA cell. FIG. 5 illustrates 10 subframes designated as subframes #0 to #9, and 14 symbols (OFDM symbols) designated as symbols #0 to #13 in the subframe #3. In this example, the LAA cell can transmit a signal up to 4 ms (corresponding to 4 subframes), and the CCA is performed on the symbol #5 in the subframe #3. Assume that the LAA cell identifies that the frequency is in the idle state through the CCA and a signal can be transmitted at symbols immediately after the identification. In FIG. 5, the LAA cell transmits the signals at the symbols from the symbol #6 in the subframe #3 to a prescribed symbol in the subframe #6.

In FIG. 5, the symbol or subframe represented as the symbol/subframe at which the channel and/or signal is not transmitted (cannot be transmitted) indicates that the LAA transmits nothing. In FIG. 5, the symbol or subframe represented as the symbol/subframe at which the channel and/or signal is transmitted (can be transmitted) indicates that the LAA transmits at least a PDSCH, and a terminal-specific Reference Signal associated with the PDSCH. The PDSCH is mapped (scheduled) to each terminal using a resource block pair as a unit. Information on the mapping (scheduling) is notified via the PDCCH or EPDCCH transmitted at each subframe. The mapping information for a PDSCH at a subframe may be notified at the identical subframe or at another subframe.

In FIG. 5, in a case that the LAA cell transmits a PDSCH using the symbol #6 to #13 in the subframe #3, the terminal receiving the PDSCH needs to recognize that the PDSCH is mapped to the symbol #6 to #13 in the subframe #3.

An example of the recognition uses information for recognizing a symbol at which a channel and/or signal is transmitted in a prescribed subframe (e.g., subframe #3) in the LAA cell. For example, the information is any or a combination of the following information.

(1) The information is information indicating a start symbol in the symbols at which the channel and/or signal is transmitted in the prescribed subframe. The information indicating the start symbol is any of 0 to 13, each value of which indicates a symbol number of a symbol to be the start symbol.

(2) The information is information indicating a start symbol in the symbols at which the channel and/or signal is transmitted in the prescribed subframe. The information indicating the start symbol is index information in which values predefined from values 0 to 13 are indexed.

(3) The information is bitmap information indicating symbols at which the channel and/or signal is transmitted in the prescribed subframe. The bitmap information is constituted by 14 bits. In the bitmap information, in a case that a bit has one state (e.g., "1"), the bit indicates the symbol at which the channel and/or signal is transmitted, and in a case that a bit has the other state (e.g., "0"), the bit indicates the symbol at which the channel and/or signal is not transmitted.

(5) The information is information indicating an end symbol in the symbols at which the channel and/or signal is not transmitted in the prescribed subframe, or information indicating the number of symbols of the symbols at which the channel and/or signal is not transmitted. For example, the end symbol is any of 0 to 13, and each value of which indicates a symbol number of a symbol to be the end symbol. For example, the information indicating the number of symbols is any of 1 to 14, and each value of which indicates the number of the symbols.

(6) The information is information indicating an end symbol in the symbols at which the channel and/or signal is not transmitted in the prescribed subframe, or information indicating the number of symbols of the symbols at which the channel and/or signal is not transmitted. For example, the end symbol is index information in which values predefined from values 0 to 13 are indexed. For example, the information indicating the number of symbols is index information in which values predefined from values 1 to 14 are indexed.

A method for notifying the information for recognizing the symbol at which the channel and/or signal is transmitted employs any of methods described as below, for example.

(1) The information is notified using the parameter configured (notified) to the LAA cell by way of RRC signaling or MAC signaling. In a case that a Serving cell is an LAA cell, the channel and/or signal is not transmitted at a symbol configured in a subframe, and the channel and/or signal is transmitted at other symbols. For example, the symbols at which the channel and/or signal is not transmitted are configured as the symbols #0 and #1 in a subframe. The symbols at which the channel and/or signal is not transmitted are configured as the symbols #2 and #13 in a subframe. This configuration may be different (independent) depending on the channel and/or signal. For example, the terminal is configured such that the EPDCCH is mapped to the symbols #2 to #13 and the PDSCH is mapped to the symbols #1 to #13 in a subframe. Moreover, for example, a range of the start symbol of the PDSCH (possible values) configured to the LAA cell may be different from a range (1 to 4) of the start symbol of the PDSCH configured to the Secondary cell of the related art. The range of the start symbol of the PDSCH and/or EPDCCH configured to the LAA cell is 0 to 13.

(2) The information is notified using a PDCCH or EPDCCH transmitted from the LAA cell or the Serving cell different from the LAA cell (assist cell, Primary cell, or Secondary cell). The DCI carried (transmitted) by the PDCCH or EPDCCH includes the information.

(3) The information is notified using a channel or signal for notifying the information. The channel or signal for notifying the information is transmitted only to the LAA cell. The channel or signal for notifying the information is transmitted from the LAA cell or the Serving cell different from the LAA cell (assist cell, Primary cell, or Secondary cell).

(4) Candidates for the information are configured (notified) to the LAA cell by way of RRC signaling or MAC signaling. Selection is made from among the candidates for the information based on the information included in the DCI carried (transmitted) by the PDCCH or EPDCCH. For example, the information indicating 4 start symbols is configured by way of RRC signaling or MAC signaling, and 2-bit information indicating one of the information pieces is notified by way of PDCCH or EPDCCH signaling.

(5) The information is notified using a channel or signal mapped to prescribed Resource Elements in a subframe. For example, the prescribed Resource Elements are multiple Resource Elements in a prescribed symbol. For example, the prescribed symbol is an end symbol in the subframe. The subframe to which the channel or signal for notifying the information is mapped may be all the subframes in the LAA cell, a predefined subframe, or a subframe configured by way of RRC signaling.

(6) The information is predefined. In a case that a Serving cell is an LAA cell, the channel and/or signal is not transmitted at a prescribed symbol, and the channel and/or signal is transmitted at other symbols in a subframe. For example, the symbols at which the channel and/or signal is not transmitted are the symbols #0 and #1 in a subframe. The symbols at which the channel and/or signal is not transmitted are the symbols #2 and #13 in a subframe. This definition may be different (independent) depending on the channel and/or signal. For example, the terminal presumes that the EPDCCH is mapped to the symbols #2 to #13 and the PDSCH is mapped to the symbols #1 to #13 in a subframe.

In another example of the recognition, the terminal detects a symbol at which a channel and/or signal is transmitted in a prescribed subframe (e.g., subframe #3) in the LAA cell. In the terminal, assist information may be configured for performing the detection. For example, a method of the detection employs any of methods described as below.

(1) The detection is performed based on a prescribed signal mapped to the prescribed subframe. The terminal detects the symbol at which the channel and/or signal is transmitted based on whether the predefined signal or the configured signal is detected in the prescribed subframe. In a case that the predefined signal or configured signal is detected at a symbol in the prescribed subframe, the terminal recognizes subsequent symbols of the symbol in the prescribed subframe as the symbols at which the channel and/or signal is transmitted. For example, the predefined signal or the configured signal is the CRS, DMRS, and/or URS.

(2) The detection is performed based on a prescribed channel mapped to the prescribed subframe. The terminal detects the symbol at which the channel and/or signal is transmitted based on whether the predefined channel or the configured channel is detected in the prescribed subframe. In a case that the predefined channel or the configured channel is detected at a symbol in the prescribed subframe, the terminal recognizes subsequent symbols of the symbol in the prescribed subframe as the symbols at which the channel and/or signal is transmitted. For example, the predefined channel or the configured channel is the EPDCCH. Specifically, the terminal presumes that the EPDCCH is mapped to a symbol and subsequent symbols in the prescribed subframe to perform monitoring of the EPDCCH (detection process, blind detection). Here, the terminal may perform the blind detection on the start symbol where the EPDCCH is presumed to be mapped. The start symbol or candidates of the start symbol where the EPDCCH is presumed to be mapped may be predefined or configured.

In FIG. 5, a method for mapping the PDCCH, EPDCCH and/or PDSCH to the Resource Element in the subframe #3 may be different from a mapping method in other subframes. For example, the mapping method may employ any of methods described below. Note that the mapping methods below (mapping procedure) may be applied also to other signals such as the Reference Signal or the synchronization signal.

(1) In the mapping method, the PDCCH, EPDCCH and/or PDSCH are mapped to from the end symbol in the subframe. In other words, mapping the PDCCH, EPDCCH and/or PDSCH to the Resource Element (k, l) is performed on symbols in order from the OFDM symbol having the maximum OFDM symbol number 1 (i.e., the end symbol in a slot) in the Resource Element capable of mapping and being an allocated physical resource block. The mapping is performed in order from the end slot in the subframe (the second slot). In each OFDM symbol, those channels are mapped in order from a subcarrier having the minimum subcarrier number k.

(2) In the mapping method, the PDCCH, EPDCCH and/or PDSCH are mapped to the Resource Element in the symbol at which the channel and/or signal is transmitted while the symbol at which the channel and/or signal is not transmitted is skipped. In other words, in mapping of the PDCCH, EPDCCH and/or PDSCH, the Resource Element in the symbol at which the channel and/or signal is not transmitted is subjected to the rate matching.

(3) In the mapping method, the PDCCH, EPDCCH and/or PDSCH are mapped to the Resource Element in the symbol at which the channel and/or signal is transmitted while the symbol at which the channel and/or signal is not transmitted is not skipped. In other words, the PDCCH, EPDCCH and/or PDSCH are mapped without distinguishing the symbol at which the channel and/or signal is transmitted from the symbol at which the channel and/or signal is not transmitted, but the channel is not transmitted that is mapped to the symbol at which the channel and/or signal is not transmitted, and the channel is transmitted that is mapped to the symbol at which the channel and/or signal is transmitted. Specifically, in mapping the PDCCH, EPDCCH and/or PDSCH, the Resource Element in the symbol at which the channel and/or signal is not transmitted is subjected to puncturing.

Figure 6:
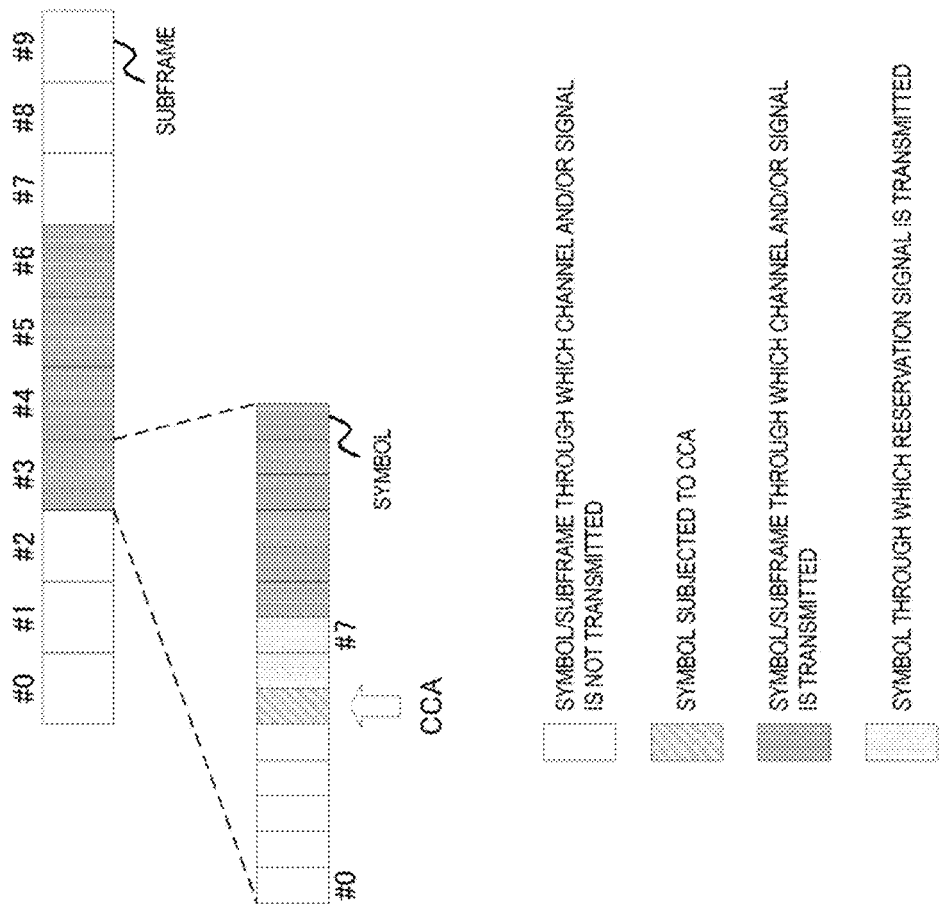
FIG. 6 is a diagram illustrating an example of the communication procedure in the LAA cell according to the present embodiment.

FIG. 6 is a diagram illustrating an example of a communication procedure in an LAA cell. Hereinafter, differences from the contents described with reference to FIG. 5 are described. In this example, the CCA is performed on the symbol #5 in the subframe #3. Assume that the LAA cell identifies that the frequency is in the idle state through the CCA and a signal can be transmitted at symbols immediately after the identification. The LAA cell transmits the signals at the symbols from the symbol #5 in the subframe #3 to a prescribed symbol in the subframe #6.

In the example in FIG. 6, the symbols #6 and #7 in the subframe #3 are symbols at which a reservation signal is transmitted. The reservation signal is transmitted at the symbols from a symbol immediately after the symbol to be subjected to the CCA (i.e., symbol #5) to a symbol immediately before the symbol at which the channel and/or signal is transmitted (i.e., symbol #6). Effects of the reservation signal are as below. As described with reference to FIG. 5, even in the case that the candidates of the symbol at which the channel and/or signal is transmitted are predefined or configured, the LAA cell can flexibly perform the CCA independently from the number of the candidates.

The reservation signal may not be received (recognized) even by the terminal which receives the channel and/or signal transmitted from the LAA cell. In other words, in a case that the channel and/or signal cannot be transmitted after performing the CCA, the reservation signal is transmitted for the LAA cell, which has performed the CCA, to ensure (reserve) the frequency.

To the symbol at which the reservation signal is transmitted, a channel and/or signal may be mapped which is different from the channel and/or signal transmitted at the symbol at which the channel and/or signal is transmitted. In other words, the channel and/or signal mapped to the symbol at which the reservation signal is transmitted is recognized (received) by the terminal. For example, the terminal identifies the symbol at which the channel and/or signal is transmitted, based on the channel and/or signal mapped to the symbol at which the reservation signal is transmitted. Moreover, for example, the terminal uses the channel and/or signal mapped to the symbol at which the reservation signal is transmitted to synchronize with (identify) the LAA cell.

The reservation signal is preferably constituted in combination of multiple signals. For example, the reservation signal is preferably constituted in combination of a signal which is a constituent of the OFDM symbol and a signal shorter than a length of the OFDM symbol. Some of the reservation signals preferably have a signal constitution suitable for synchronization, such as the PSS and SSS. Some of the reservation signals are preferably constituted by ID identifying a transmission point (and operator). Some of the reservation signals are preferably transmitted at one or more symbols. Some of the reservation signals may be an RS for the CSI measurement. The reservation signal and the CSI-RS may be configured to be located at the quasi co-location when observed from the terminal device 1.

Figure 7:
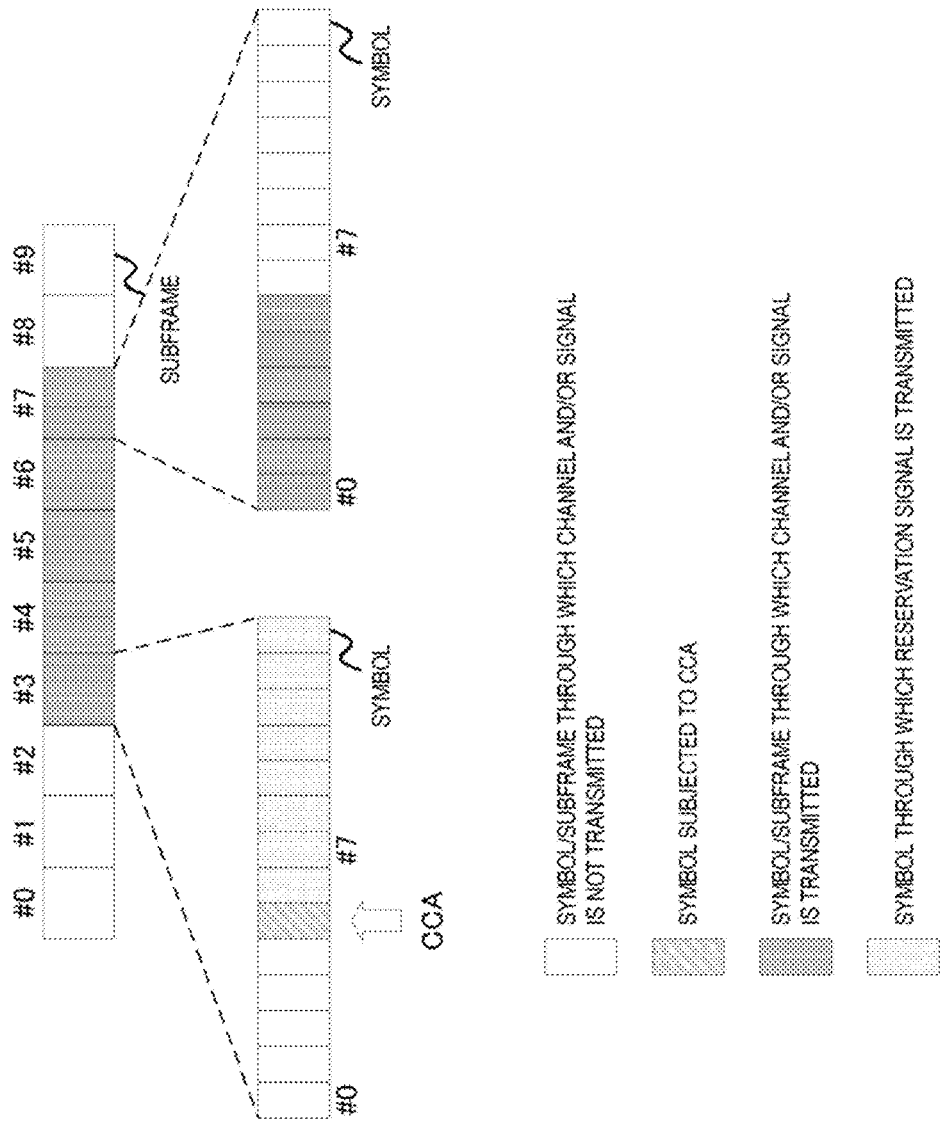
FIG. 7 is a diagram illustrating an example of the communication procedure in the LAA cell according to the present embodiment.

FIG. 7 is a diagram illustrating an example of a communication procedure in an LAA cell. Hereinafter, differences from the contents described with reference to FIG. 5 are described. In this example, the CCA is performed on the symbol #5 in the subframe #3 as is the example in FIG. 5. Assume that the LAA cell identifies that the frequency is in the idle state through the CCA and a signal can be transmitted at symbols immediately after the identification. In FIG. 7, the LAA cell transmits the signals at from the symbol #6 in the subframe #3 to the symbol #5 in the subframe #7 after 4 ms.

In the example in FIG. 7, the LAA cell transmits the reservation signal at the symbols from a symbol immediately after the symbol to be subjected to the CCA to the end symbol in the subframe including the symbol to be subjected to the CCA. The LAA cell transmits the channel and/or signal at subframes subsequent to the subframe including the symbol to be subjected to the CCA. The reservation signal in FIG. 7 includes the reservation signal described with reference to FIG. 6.

For example, in FIG. 7, the terminal can presume that the channel and/or signal is transmitted at the subframe #4 and subsequent subframes. This causes the terminal to presume that the channel and/or signal is transmitted at the symbols started from the first symbol in the subframe. Therefore, the base stations including LAA cell can use the same method as those of the related art for the terminal with respect to the transmission of the channel and/or signal and notification of the control information for the channel and/or signal.

In FIG. 7, the LAA cell can transmit the channel and/or signal at the symbols from the first symbol to the symbol #5 in the subframe #7. For example, the LAA cell can transmit to the terminal the PDSCH and/or EPDCCH mapped to resources from a prescribed symbol to the symbol #5 in subframe #7. The LAA cell can transmit to the terminal the PDCCH mapped to resources from the first symbol to a prescribed symbol in the subframe #7. For example, a prescribed symbol is determined based on information transmitted on the PCFICH and on the number of OFDM symbols used to transmit the PDCCH. Moreover, for example, a prescribed symbol is determined based on information which is the control information configured by way of RRC signaling and indicates an OFDM start symbol which is for the EPDCCH, the PDSCH scheduled by the PDCCH, and the PDSCH scheduled by the EPDCCH.

In FIG. 7, the LAA cell can notify or configure to the terminal the end symbol at which the channel and/or signal is transmitted in the subframe #7. In a subframe in the LAA cell, for the information for the terminal to recognize the end symbol and the method for notifying the information, those described in the example in FIG. 5 can be used. The method described in the example in FIG. 5 relates to the information for recognizing the symbol at which the channel and/or signal is transmitted in FIG. 5 and the method for notifying the information. For example, in the LAA cell, the information on the end symbol is included in the DCI notified by the PDCCH or EPDCCH transmitted at the subframe #7. This allows the LAA cell to efficiently use the resource in the case that the channel and/or signal can be transmitted at the symbols until a symbol in the middle of the subframe as is the subframe #7 in FIG. 7. For example, in the LAA cell, the information on the end symbol is included in information configured by way of RRC signaling or MAC signaling.

In FIG. 7, a method is described to be used as a combination of the transmission method in the subframe #3 and the transmission method in the subframe #7, but is not limited thereto. The transmission method in subframe #3 and the transmission method in the subframe #7 may be used independently from each other. Some or all of the methods described with reference to FIGS. 5 to 7 may be used in combination.

Moreover, in the subframe #7 in FIG. 7, the mapping of the PDCCH, EPDCCH and/or PDSCH to the Resource Element may be different from the mapping in other subframes.

In the LAA cell, a subframe where the channel and/or signal can be transmitted at all the OFDM symbols in the single subframe itself (i.e., the subframes #4 to #6 in FIGS. 5 to 7) may be recognized, configured, or notified as a subframe different from a subframe where the channel and/or signal cannot be transmitted at some OFDM symbols in the single subframe itself (i.e., the subframe #3 in FIGS. 5 to 7, and the subframe #7 in FIG. 7). For example, a subframe where the channel and/or signal can be transmitted at all the OFDM symbols in the single subframe itself is equivalent to a subframe in the Serving cell of the related art.

In the present embodiment, a subframe where the channel and/or signal cannot be transmitted at all the OFDM symbols in the single subframe itself is also referred to as a "first LAA subframe". A subframe where the channel and/or signal cannot be transmitted at some OFDM symbols in the single subframe itself is also referred to as a "second LAA subframe". A subframe where the channel and/or signal can be transmitted at all the OFDM symbols in the single subframe itself is also referred to as a "third LAA subframe".

The method described in the present embodiment can be used for a method for the terminal to recognize the first LAA subframe, the second LAA subframe, and the third LAA subframe. For example, the method for recognizing the subframes uses the information for recognizing the symbol at which the channel and/or signal is transmitted and the method for notifying the information.

The method for the terminal to recognize the first LAA subframe, the second LAA subframe, and the third LAA subframe may be explicitly notified or configured by way of PDCCH or RRC signaling.

The method for the terminal to recognize the first LAA subframe, the second LAA subframe, and the third LAA subframe may be implicitly notified or configured based on the information (parameter) notified or configured by way of PDCCH or RRC signaling. For example, the terminal recognizes the first LAA subframe, the second LAA subframe, and the third LAA subframe based on the information on the mapping of the CRS.

In a case that the terminal recognizes a subframe as the second LAA subframe, the terminal recognizes a prescribed number of subframes subsequent to the subframe as the third LAA subframes. The terminal recognizes, as the first LAA subframes, subframes subsequent to the end of the subframes which are recognized as the third LAA subframes until the terminal recognizes the second LAA subframes. The prescribed number (i.e., the number of subframes recognized as the third LAA subframes) may be predefined. The prescribed number may be configured in the LAA cell. The prescribed number may be notified using the channel and/or signal mapped to the second LAA subframe.

In the second LAA subframe and the third LAA subframe, the start symbol of the PDSCH and/or EPDCCH is independently defined or configured.

FIGS. 5 to 7 illustrate that the CCA is performed on a single subframe, but a time (period) for performing the CCA is not limited thereto. The time for performing the CCA may vary for each LAA cell, for each timing of the CCA, or for each execution of the CCA. For example, the CCA is performed at the time based on a prescribed time slot (time period, time domain). The prescribed time slot may be defined or configured by a time obtained by dividing a single subframe into a prescribed number of sections. The prescribed time slot may be defined or configured by a prescribed number of subframes.

In the present embodiment, a size of a field in the time domain such as the time (time slot) for performing the CCA, or a time when the channel and/or signal is transmitted (can be transmitted) at a subframe can be represented using a prescribed time unit. For example, the size of the field in the time domain is represented as some time units Ts. Ts is $1/(15000*2048)$ sec. For example, a time of a single subframe is $30720*Ts$ (1 ms).

As is the subframe #3 in the FIGS. 5 to 7, whether the LAA cell can transmit the channel and/or signal (including the reservation signal) at the symbols from the middle of symbols in the subframe may be configured to the terminal or LAA cell. For example, in the configuration concerning the LAA cell, information is configured to the terminal, the information indicating whether RRC signaling allows such a transmission. The terminal switches, based on the information, the processes concerning the reception in the LAA cell (monitoring, recognition, decoding).

The subframe capable of the transmission from the middle of symbols (including the subframe capable of the transmission until the middle of the symbols) may be all the subframes in the LAA cell. The subframe capable of the transmission from the middle of symbols may be a subframe predefined or subframe configured to the LAA cell.

The subframe capable of the transmission from the middle of symbols (including the subframe capable of the transmission until the middle of the symbols) can be configured, notified, or decided based on the TDD uplink/downlink configuration (UL/DL configuration). For example, such a subframe is a subframe notified (specified) as the special subframe by the UL/DL configuration. The special subframe in the LAA cell is a subframe including at least one of three fields, a Downlink Pilot Time Slot (DwPTS), a Guard Period (GP), and an Uplink Pilot Time Slot (UpPTS). The configuration concerning the special subframe in the LAA cell may be configured or notified by way of RRC signaling, or PDCCH or EPDCCH signaling. This configuration configures a time length with respect to at least one of the DwPTS, GP, and UpPTS. This configuration is index information indicating candidates of a predefined time length. Further, this configuration can use the same time length as the DwPTS, GP, and UpPTS used for the special subframe configuration configured to the TDD cell of the related art. In other words, the time length capable of transmission at a subframe is determined based on any of the DwPTS, GP, and UpPTS.

In the present embodiment, the reservation signal may be a signal which can be received by a LAA cell different from the LAA cell transmitting the reservation signal. For example, a LAA cell different from the LAA cell transmitting the reservation signal is a LAA cell (adjacent LAA cell) adjacent to the LAA cell transmitting the reservation signal. For example, the reservation signal includes information on a transmission state (usage state) of a prescribed subframe and/or symbol in the LAA cell. In a case that an LAA cell different from the LAA cell transmitting a reservation signal receives the reservation signal, the LAA cell that has received the reservation signal recognizes a transmission state of a prescribed subframe and/or symbol based on the reservation signal to perform scheduling depending on the state.

The LAA cell that has received the reservation signal may perform the LBT before transmitting the channel and/or signal. The LBT is performed based on the received reservation signal. For example, in the LBT, scheduling including the resource allocation or the MCS selection is performed, taking into account the channel and/or signal transmitted (presumed to be transmitted) by the LAA cell that has transmitted the reservation signal.

In a case that the LAA cell that has received the reservation signal performs scheduling of transmitting the channel and/or signal based on the reservation signal, information on the scheduling can be notified to one or more LAA cells including the LAA cell that has transmitted the reservation signal according to a prescribed method. For example, the prescribed method is a method of transmitting a prescribed channel and/or signal including the reservation signal. Moreover, for example, the prescribed method is a method of notifying via a backhaul such as the X2 interface.

In the carrier aggregation and/or dual connectivity, the terminal of the related art can configure up to 5 Serving cells, but the terminal in the present embodiment can extend the maximum number of Serving cells to be configured. In other words, more than 5 Serving cells can be configured to the terminal in the present embodiment. For example, up to 16 or 32 Serving cells can be configured to the terminal in the present embodiment. For example, more than 5 Serving cells configured to the terminal in the present embodiment include the LAA cell. Moreover, all of more than 5 Serving cells configured to the terminal in the present embodiment may be the LAA cells.

In the case that more than 5 Serving cells can be configured, the configuration for some Serving cells may be different from the configuration of the Serving cell of the related art (i.e., the Secondary cell of the related art). For example, the following points are different regarding the configuration. The configurations described below may be used in combination.

(1) Up to 5 Serving cells of the related art and up to 11 or 27 Serving cells different from the Serving cell of the related art are configured to the terminal. In other words, up to 4 Secondary cells of the related art, and 11 or 27 Secondary cells different from the Secondary cell of the related art are configured to the terminal, in addition to the Primary cell of the related art.

(2) The configuration concerning the Serving cell (Secondary cell) different from the Serving cell of the related art includes the configuration concerning the LAA cell. For example, up to 4 Secondary cells excluding the configuration concerning the LAA cell, and up to 11 or 27 Secondary cells different from the Secondary cell of the related art are configured to the terminal, in addition to the Primary cell of the related art.

Further, in the case that more than 5 Serving cells can be configured, the base station (including the LAA cell) and/or terminal can perform the process or presumption different from those in the case that up to 5 Serving cells are configured. For example, the following points are different regarding the process or presumption. The processes or presumptions described below may be used in combination.

(1) Even in the case that more than 5 Serving cells are configured, the terminal presumes that the PDCCH, EPDCCH and/or PDSCH are simultaneously transmitted (received) from 5 Serving cells at most. This allows the terminal to use the method similar to those of the related art regarding the reception of the PDCCH, EPDCCH and/or PDSCH, and the transmission of the HARQ-ACK in response to the PDSCH.

(2) In the case that more than 5 Serving cells are configured, a combination (group) of cells for bundling the HARQ-ACKs in response to the PDSCH in the Serving cells is configured to the terminal. For example, all the Serving cells, all the Secondary cells, all the LAA cells, or all the Secondary cells different from the Secondary cell of the related art include information (configuration) on bundling of the HARQ-ACKs between the Serving cells. For example, the information on bundling of the HARQ-ACKs between the Serving cells is an identifier (index, ID) for the bundling. For example, the HARQ-ACKs are bundled over cells with the same identifier for the bundling. The bundling is performed by an AND operation on the target HARQ-ACKs. The maximum number of identifiers for the bundling may be set to 5. The maximum number of identifiers for the bundling may be set to 5 including the number of cells not performing the bundling. In other words, the number of groups performing bundling across the Serving cells may be set to 5 at most. This allows the terminal to use the method similar to those of the related art regarding the reception of the PDCCH, EPDCCH and/or PDSCH, and the transmission of the HARQ-ACK in response to the PDSCH.

(3) In the case that more than 5 Serving cells are configured, a combination (group) of cells for multiplexing the HARQ-ACKs in response to the PDSCH in the Serving cells is configured to the terminal. In the case that the combination (group) of cells for multiplexing the HARQ-ACKs in response to the PDSCH is configured, the multiplexed HARQ-ACKs are transmitted on the PUCCH or PUSCH based on the group. In each group, the maximum number of multiplexed Serving cells is defined or configured. The maximum number is defined or configured based on the maximum number of Serving cells configured to the terminal. For example, the maximum number is the same as the maximum number of Serving cells configured to the terminal, or half of the maximum number of Serving cells configured to the terminal. The maximum number of PUCCHs simultaneously transmitted is defined or configured based on the maximum number of Serving cells multiplexed in each group, and the maximum number of Serving cells configured to the terminal.

In other words, the number of first Serving cells (i.e., Primary cell and/or Secondary cell) to be configured is equal to or less than a prescribed number (i.e., "5"), and the total number of first Serving cells and the second Serving cells (i.e., LAA cells) to be configured exceeds the prescribed number.

Next, a terminal capability relating to the LAA is described. The terminal notifies the base station of (transmits to the base station) information on a capability of the terminal (terminal capability) by way of RRC signaling based on an instruction from the base station. The terminal capability with respect to a function (feature) is notified (transmitted) in a case that the function (feature) is supported, and is not notified (not transmitted) in a case that the function (feature) is not supported. The terminal capability with respect to a function (feature) may be information indicating whether a test and/or implementation of the function (feature) is completed. For example, the terminal capability in the present embodiment is as below. The terminal capabilities described below may be used in combination.

(1) The terminal capability concerning support of the LAA cell and the terminal capability concerning support of the configuration of more than 5 Serving cells are defined independently from each other. For example, the terminal supporting the LAA cell supports the configuration of more than 5 Serving cells. In other words, the terminal not supporting the configuration of more than 5 Serving cells does not support the LAA cell. In this case, the terminal supporting the configuration of more than 5 Serving cells may or may not support the LAA cell.

(2) The terminal capability concerning the support of the LAA cell and the terminal capability concerning the support of the configuration of more than 5 Serving cells are defined independently from each other. For examples, the terminal supporting the configuration of more than 5 Serving cells supports the LAA cell. In other words, the terminal not supporting the LAA cell does not support the configuration of more than 5 Serving cells. In this case, the terminal supporting the LAA cell may or may not support the configuration of more than 5 Serving cells.

(3) The terminal capability concerning the downlink in the LAA cell and the terminal capability concerning the uplink in the LAA cell are defined independently from each other. For example, the terminal supporting the uplink in the LAA cell supports the downlink in the LAA cell. In other words, the terminal not supporting the downlink in the LAA cell does not support the uplink in the LAA cell. In this case, the terminal supporting the downlink in the LAA cell may or may not support the uplink in the LAA cell.

(4) The terminal capability concerning the support of the LAA cell includes support of the transmission mode configured only to the LAA cell.

(5) The terminal capability concerning the downlink in the configuration of more than 5 Serving cells and the terminal capability concerning the uplink in the configuration of more than 5 Serving cells are defined independently from each other. For example, the terminal supporting the uplink in the configuration of more than 5 Serving cells supports the downlink in the configuration of more than 5 Serving cells. In other words, the terminal not supporting the downlink in the configuration of more than 5 Serving cells does not support the uplink in the configuration of more than 5 Serving cells. In this case, the terminal supporting the downlink in the configuration of more than 5 Serving cells may or may not support the uplink in the configuration of more than 5 Serving cells.

(6) In the terminal capability in the configuration of more than 5 Serving cells, the terminal capability supporting the configuration of up to 16 downlink Serving cells (component carriers) and the terminal capability supporting the configuration of up to 32 downlink Serving cells are defined independently from each other. The terminal supporting the configuration of up to 16 downlink Serving cells supports the configuration of at least one uplink Serving cell. The terminal supporting the configuration of up to 32 downlink Serving cells supports the configuration of at least two uplink Serving cells. In other words, the terminal supporting the configuration of up to 16 downlink Serving cells may not support the configuration of two or more uplink Serving cells.

(7) The terminal capability concerning the support of the LAA cell is notified based on the frequency (band) used in the LAA cell. For example, in notification of a frequency or a combination of frequencies supported by the terminal, in a case that the frequency or the combination of frequencies to be notified includes at least one frequency used in the LAA cell, the terminal implicitly notifies the base station of supporting the LAA cell. In other words, in a cast that the frequency or the combination of frequencies to be notified does not include any frequency used in the LAA cell at all, the terminal implicitly notifies the base station of not supporting the LAA cell.

In the present embodiment, a description is given of a case that the LAA cell transmits the PDCCH or EPDCCH notifying the DCI for the PDSCH transmitted by the LAA cell (i.e., a case of self-scheduling), but the present embodiment is not limited thereto. For example, the method described in the present embodiment can be applied also to a case that the Serving cell different from the LAA cell transmits the PDCCH or EPDCCH notifying the DCI for the PDSCH transmitted by the LAA cell (i.e., a case of cross carrier scheduling).

In the present embodiment, information for recognizing the symbol at which the channel and/or signal is transmitted may be based on the symbol at which the channel and/or signal is not transmitted. For example, the information is information indicating the end symbol in the symbols at which the channel and/or signal is not transmitted. Moreover, the information for recognizing the symbol at which the channel and/or signal is transmitted may be determined based on other information or parameters.

In the present embodiment, the symbol at which the channel and/or signal is transmitted may be configured (notified, or defined) independently from the channel and/or signal. In other words, the information for recognizing the symbol at which the channel and/or signal is transmitted and the method for notifying the information can be configured (notified, or defined) independently from the channel and/or signal. For example, the information for recognizing the symbol at which the channel and/or signal is transmitted and the method for notifying the information can be configured (notified, or defined) independently by the PDSCH and the EPDCCH.

In the present embodiment, the symbol/subframe at which the channel and/or signal is not transmitted (cannot be transmitted) may be the symbol/subframe at which the channel and/or signal is not presumed, from the viewpoint of the terminal, to be transmitted (transmittable). In other words, the terminal can assume that the LAA cell is not transmitting the channel and/or signal at the symbol/subframe.

Moreover, in the present embodiment, the symbol/subframe at which the channel and/or signal is transmitted (can be transmitted) may be the symbol/subframe at which the channel and/or signal is presumed, from the viewpoint of the terminal, to be possibly transmitted. In other words, that terminal can assume that the LAA cell may or may not be transmitting the channel and/or signal at the symbol/subframe.

Further, in the present embodiment, the symbol/subframe at which the channel and/or signal is transmitted (can be transmitted) may be the symbol/subframe at which the channel and/or signal is presumed, from the viewpoint of the terminal, to be being surely transmitted. In other words, the terminal can assume that the LAA cell is surely transmitting the channel and/or signal at the symbol/subframe.

A part of the content described in the present embodiment can be restated as below.

A terminal device configured to communicate with a base station device includes a higher layer processing unit configured to configure at least one first Serving cell (for example, the Primary cell and/or the Secondary cell) and at least one second Serving cell (for example, the LAA cell), and a reception unit configured to receive a Physical Downlink Shared Channel in the first Serving cell and/or the second Serving cell. The Physical Downlink Shared Channel in the first Serving cell is mapped up till the end OFDM symbol in all the subframes, and the Physical Downlink Shared Channel in the second Serving cell is mapped up till a first OFDM symbol in a prescribed subframe.

The reception unit receives a Physical Downlink Control Channel mapped up till a second OFDM symbol or an Enhanced Physical Downlink Control Channel mapped up till the first OFDM symbol, in a prescribed subframe in the second Serving cell. The Physical Downlink Control Channel or the Enhanced Physical Downlink Control Channel includes a downlink control information format used for scheduling the Physical Downlink Shared Channel.

The first OFDM symbol is notified by the information transmitted using the downlink control information format.

The first OFDM symbol and the second OFDM symbol are configured independently from each other by way of signaling of the higher layer.

The reception unit receives the Physical Downlink Shared Channel mapped up till the end OFDM symbol, in each of the prescribed number of subframes before a prescribed subframe.

The first OFDM symbol is notified using the DwPTS in the special subframe in the TDD cell.

A base station device configured to communicate with a terminal device includes a higher layer processing unit configured to configure at least one first Serving cell and at least one second Serving cell to the terminal device, and a transmission unit configured to transmit the Physical Downlink Shared Channel in the first Serving cell and/or the second Serving cell. The Physical Downlink Shared Channel in the first Serving cell is mapped up till the end OFDM symbol in all the subframes. The Physical Downlink Shared Channel in the second Serving cell is mapped up toll the first OFDM symbol in a prescribed subframe.

A terminal device configured to communicate with a base station device includes a higher layer processing unit configured to configure at least one first Serving cell and at least one second Serving cell, and a reception unit configured to receive the Physical Downlink Shared Channel in the first Serving cell and/or the second Serving cell. The Physical Downlink Shared Channel in the first Serving cell is mapped to the first OFDM symbol and subsequent symbols configured by way of signaling of the higher layer in all the subframes. The Physical Downlink Shared Channel in the second Serving cell is mapped to the second OFDM symbol and subsequent symbols in a prescribed subframe.

The reception unit receives an Enhanced Physical Downlink Control Channel mapped to a third OFDM symbol and subsequent symbols, in a prescribed subframe in the second Serving cell. The Enhanced Physical Downlink Control Channel includes the downlink control information format used for scheduling the Physical Downlink Shared Channel.

The second OFDM symbol is notified by the information transmitted using the downlink control information format.

The second OFDM symbol and the third OFDM symbol are configured independently from each other by way of signaling of the higher layer.

The reception unit receives the PDSCH mapped to from the first OFDM symbol to the end OFDM symbol, in each of the prescribed number of subframes after a prescribed subframe.

A base station device configured to communicate with a terminal device includes a higher layer processing unit configured to configure at least one first Serving cell and at least one second Serving cell to the terminal device, and a transmission unit configure to transmit the Physical Downlink Shared Channel in the first Serving cell and/or the second Serving cell. The Physical Downlink Shared Channel in the first Serving cell is mapped to the first OFDM symbol and subsequent symbols configured by way of signaling of the higher layer in all the subframes. The Physical Downlink Shared Channel in the second Serving cell is mapped to the second OFDM symbol and subsequent symbols in a prescribed subframe.

A terminal device configured to communicate with a base station device includes a higher layer processing unit configured to configure at least one first Serving cell and at least one second Serving cell. Any one of the first Serving cells is the Primary cell. The first Serving cells other than the Primary cell are the Secondary cell. The second Serving cell is the Secondary cell. The configuration of the Secondary cell that is the second Serving cell is different from the configuration of the Secondary cell that is the first Serving cell.

The frequency configurable to the first Serving cell is different from the frequency configurable to the second Serving cell.

The second Serving cell is different from the first Serving cell in the presumption of the signal and/or channel in an activated state.

In the second Serving cell, the presumption of the signal and/or channel in the activated state is determined for each subframe.

In a prescribed subframe in the second Serving cell, the signal and/or channel is not mapped to a prescribed OFDM symbol configured by way of signaling of the higher layer.

The number of first Serving cells to be configured is a prescribed number or less, and the total number of first Serving cells and second Serving cells to be configured exceeds a prescribed number.

In the first Serving cell, the downlink channel and the uplink channel are supported. In the second Serving cell, the downlink channel only is supported.

A base station device configured to communicate with a terminal device includes a higher layer processing unit configured to configure at least one first Serving cell and at least one second Serving cell to the terminal device. Any one of the first Serving cells is the Primary cell. The first Serving cells other than the Primary cell are the Secondary cell. The second Serving cell is the Secondary cell. The configuration of the Secondary cell that is the second Serving cell is different from the configuration of the Secondary cell that is the first Serving cell.

Note that in the LAA cell, in the measurement for the radio resource management (RRM), a Received Signal Strength Indicator (RSSI) may be reported in addition to a Reference Signal Received Power (RSRP) and a Reference Signal Received Quality (RSRQ). The RSSI is an average received power for the OFDM symbol including the RS (CRS) on the antenna port 0. Alternatively, the RSSI is an average received power for all of the OFDM symbols. Note that the RSSI may be configured separately from the configuration of the measurement of the RSRP or RSRQ. In other words, the RSSI and RSRQ measured for reporting may be different from RSSI RSSI measured for calculation. For example, the RSSI measured for calculating the RSRQ is measured at only the OFDM symbol in downlink parts of the subframes in a DS section, the RSSI measured for reporting may be measured at the OFDM symbol in downlink parts of all the downlink subframes.

Next, an example of the CSI reference resource is described.

The CSI reference resource is a resource used for the terminal device 1 to perform the CSI measurement (calculation of the CQI and/or the PMI and/or the RI). For example, the terminal device 1 uses a group of the downlink physical resource blocks indicated by the CSI reference resource to measure the CSI in the case that the PDSCH is transmitted. In a case that a CSI subframe sets are configured by the higher layer, each of the CSI reference resources belongs to either of the CSI subframe sets, and does not belong to both of the CSI subframe sets.

In a frequency direction, the CSI reference resource is defined by a group of downlink physical resource blocks corresponding to a band relating to the value of a required CQI.

In a layer direction (spatial direction), the CSI reference resource is defined by the RI and PMI conditioned by the required CQI. In other words, in the layer direction (spatial direction), the CSI reference resource is defined by the RI and PMI which is presumed or generated when requiring the CQI.

In a time direction, the CSI reference resource is defined by a single prescribed downlink subframe. Specifically, the CSI reference resource is defined by a subframe prior by the prescribed number of subframes to the subframe for the CSI reporting. The prescribed number of subframes for defining the CSI reference resource is determined based on the transmission mode, the frame structure type, the number of CSI processes to be configured, and/or a CSI reporting mode, or the like.

A description is given below of an example of a prescribed subframe $n-n_{CQI\_ref}$ defining the CSI reference resource of the CSI reported at an uplink subframe n.

For example, for the terminal device 1 configured in transmission mode 1-9 or transmission mode 10 with a single CSI process configured to the Serving cell, and the periodic CSI reporting, $n_{CQI\_ref}$ is the smallest value greater than or equal to 4 in the valid downlink subframes or valid special subframes.

For example, for the terminal device 1 configured in transmission mode 1-9 or transmission mode 10 with a single CSI process configured to the Serving cell, and the aperiodic CSI reporting, in a case that a higher layer parameter (csi-SubframePatternConfig-r12) specifying the CSI subframe set is not configured to the terminal device 1, the CSI reference resource is the valid subframe or valid special subframe, which is the same as the subframe at which the CSI request in the uplink DCI format, corresponding to the aperiodic CSI reporting, is received. For example, for the terminal device 1 configured in transmission mode 1-9 or transmission mode 10 with a single CSI process configured to the Serving cell, and the aperiodic CSI reporting, in a case that the higher layer parameter (csi-SubframePatternConfig-r12) specifying the CSI subframe set is not configured to the terminal device 1, $n_{CQI\_ref}$ is 4, and the subframe $n-n_{CQI\_ref}$ is the valid downlink subframe or valid special subframe. The subframe $n-n_{CQI\_ref}$ is a subframe received after the subframe at which the CSI request in the random access response grant, corresponding to the aperiodic CSI reporting, is received.

For example, for the terminal device 1 configured in transmission mode 1-9, and the aperiodic CSI reporting, in a case that the higher layer parameter (csi-SubframePatternConfig-r12) specifying the CSI subframe set is configured to the terminal device 1, $n_{CQI\_ref}$ is the smallest value greater than or equal to 4, and the subframe $n-n_{CQI\_ref}$ is the valid downlink subframe or valid special subframe and is a subframe received after the subframe at which the CSI request in the uplink DCI format, corresponding to the aperiodic CSI reporting, is received. For example, for the terminal device 1 configured in transmission mode 1-9, and the aperiodic CSI reporting, in a case that the higher layer parameter (csi-SubframePatternConfig-r12) specifying the CSI subframe set is configured to the terminal device 1, $n_{CQI\_ref}$ is the smallest value greater than or equal to 4, and the subframe $n-n_{CQI\_ref}$ is the valid downlink subframe or valid special subframe and is a subframe received after the subframe at which the CSI request in the random access response grant, corresponding to the aperiodic CSI reporting, is received. However, in a cast that there is no valid value for $n_{CQI\_ref}$ in the above conditions, the subframe $n-n_{CQI\_ref}$ is a subframe of the smallest index in the radio frame in the valid downlink subframe or valid special subframe before the subframe at which the CSI request corresponding to the aperiodic CSI reporting is received.

For example, for the terminal device 1 configured in transmission mode 10 with a single CSI process configured to the Serving cell, and the aperiodic CSI reporting, in a case that the higher layer parameter (csi-SubframePatternConfig-r12) specifying the CSI subframe set is configured to the terminal device 1, $n_{CQI\_ref}$ is the smallest value greater than or equal to 4, and the subframe $n-n_{CQI\_ref}$ is the valid downlink subframe or valid special subframe. For example, for the terminal device 1 configured in transmission mode 10 with a single CSI process configured to the Serving cell, and the aperiodic CSI reporting, in a case that the higher layer parameter (csi-SubframePatternConfig-r12) specifying the CSI subframe set is configured to the terminal device 1, $n-n_{CQI\_ref}$ is the smallest value greater than or equal to 4, and the subframe $n-n_{CQI\_ref}$ is the valid downlink subframe or valid special subframe and is a subframe received after the subframe at which the CSI request in the random access response grant, corresponding to the aperiodic CSI reporting, is received.

For example, for the terminal device 1 configured in transmission mode 10 with multiple CSI processes configured to an FDD Serving cell, and the periodic or aperiodic CSI reporting, $n-n_{CQI\_ref}$ is the smallest value greater than or equal to 5, and the subframe $n-n_{CQI\_ref}$ is the valid downlink subframe or valid special subframe. Here, the aperiodic CSI reporting corresponds to the CSI request in the uplink DCI format.

For example, for the terminal device 1 configured in transmission mode 10 with multiple CSI processes configured to the FDD Serving cell, and the aperiodic CSI reporting, $n-n_{CQI\_ref}$ is the smallest value greater than or equal to 5, and the subframe $n-n_{CQI\_ref}$ is the valid downlink subframe or valid special subframe and is a subframe received after the subframe at which the CSI request in the random access response grant, corresponding to the aperiodic CSI reporting, is received.

For example, for the terminal device 1 configured in transmission mode 10 with 2 or 3 CSI processes configured to an TDD Serving cell, and the periodic or aperiodic CSI reporting, $n-n_{CQI\_ref}$ is the smallest value greater than or equal to 4, and the subframe $n-n_{CQI\_ref}$ is the valid downlink subframe or valid special subframe. Here, the aperiodic CSI reporting corresponds to the CSI request in the uplink DCI format.

For example, for the terminal device 1 configured in transmission mode 10 with 2 or 3 CSI processes configured to the TDD Serving cell, and the aperiodic CSI reporting, $n-n_{CQI\_ref}$ is the smallest value greater than or equal to 4, and the subframe $n-n_{CQI\_ref}$ is the valid downlink subframe or valid special subframe and is a subframe received after the subframe at which the CSI request in the random access response grant, corresponding to the aperiodic CSI reporting, is received.

For example, for the terminal device 1 configured in transmission mode 10 with 4 CSI processes configured to the TDD Serving cell, and the periodic or aperiodic CSI reporting, $n-n_{CQI\_ref}$ is the smallest value greater than or equal to 5, and the subframe $n-n_{CQI\_ref}$ is the valid downlink subframe or valid special subframe. Here, the aperiodic CSI reporting corresponds to the CSI request in the uplink DCI format.

For example, for the terminal device 1 configured in transmission mode 10 with 4 CSI processes configured to the TDD Serving cell, and the aperiodic CSI reporting, $n-n_{CQI\_ref}$ is the smallest value greater than or equal to 5, and the subframe $n-n_{CQI\_ref}$ is the valid downlink subframe or valid special subframe and is a subframe received after the subframe at which the CSI request in the random access response grant, corresponding to the aperiodic CSI reporting, is received.

Note that in a case that there is no valid downlink subframe or valid special subframe for the CSI reference resource in the Serving cell, the CSI reporting for the subframe is omitted (not transmitted, ceased).

A description is given below of an example of a prescribed subframe $n-n_{CQI\_ref}$ defining the CSI reference resource of the CSI in the LAA cell reported at an uplink subframe n.

For example, for the periodic CSI reporting in the LAA cell, there is a subframe required for calculating at least CSI between the subframe $n-n_{CQI\_ref}$ for the CSI reference resource and the reported uplink subframe n. The subframe required for calculating the CSI is 4. In a case that the subframe n-4 is not a valid subframe, a subframe prior to the subframe n-4 may be referred to. In other words, for the LAA cell, and the periodic CSI reporting, $n-n_{CQI\_ref}$ is the smallest value greater than or equal to 4 in the valid downlink subframes or valid special subframes. Note that the number of subframes required for calculating the CSI may be increased or decreased depending on the number of the CSIs simultaneously calculated. Note that in a case that there is no valid downlink subframe or valid special subframe for the CSI reference resource in the Serving cell and/or CSI process, the CSI reporting for the subframe is omitted.

For example, for the aperiodic CSI reporting in the LAA cell, in a case that the subframe at which the CSI request for the aperiodic CSI reporting is received is a valid subframe, the terminal device 1 measures the CSI of the Serving cell and/or CSI process and/or CSI subframe set associated with the CSI request in the valid subframe. On the other hand, for the aperiodic CSI reporting in the LAA cell, in a case that the subframe at which the CSI request for the aperiodic CSI reporting is received is not a valid subframe, the CSI of the Serving cell and/or CSI process and/or CSI subframe set associated with the CSI request is not measured, and the CSI reporting thereof is omitted. In other words, for the LAA cell, and the aperiodic CSI reporting, the CSI reference resource is the valid subframe or valid special subframe, which is the same as the subframe at which the CSI request in the uplink DCI format, corresponding to the aperiodic CSI reporting, is received. Alternatively, in a case that there is no valid subframe even when referring to the prior subframes, a dummy CSI may be used for the CSI reporting. The dummy CSI is CSI not based on subframe, and is CSI with the CQI out of a range (CQI index 0), for example. The dummy CSI is preferably information recognizable as the dummy CSI by the base station device 2.

For example, for the aperiodic CSI reporting in the LAA cell, in a case that the subframe at which the CSI request for the aperiodic CSI reporting is received is a valid subframe, the terminal device 1 measures the CSI of the Serving cell and/or CSI process and/or CSI subframe set associated with the CSI request in the valid subframe. On the other hand, for the aperiodic CSI reporting in the LAA cell, in a case that the subframe at which the CSI request for the aperiodic CSI reporting is received is not a valid subframe, the CSI reference resource is referred to a valid subframe prior to the subframe at which the CSI request for the aperiodic CSI reporting is received. In other words, for the LAA cell, and the aperiodic CSI reporting, $n_{CQI\_ref}$ is the smallest value greater than or equal to 4, and the subframe $n-n_{CQI\_ref}$ is the valid downlink subframe or valid special subframe. Note that particularly in a case that the CSI measurement by the CRS is configured, the number of prior subframes referred to may be limited. The limitation on the number of prior subframes referred to is until the number of subframes configured by the RRC message, or until the subframe at which the uplink grant for the CSI request, for example, is received. Further, in a case that there is no valid subframe even when referring to the prior subframes, the CSI reporting may be omitted. Alternatively, in the case that there is no valid subframe even by tracing back the prior subframe, a dummy CSI may be used for the CSI reporting. The dummy CSI is CSI not based on subframe, and is CSI with the CQI out of a range (CQI index 0), for example. The dummy CSI is preferably information recognizable as the dummy CSI by the base station device 2. Alternatively, in the case that the number of prior subframes referred to is limited and there is no valid subframe even when referring to the prior subframes in the subframe section, a further prior valid subframe is the CSI reference resource. The further prior valid subframe is a prescribed subframe in the contiguous subframes transmission (transmission burst) previously detected by the terminal device 1 (e.g., a subframe subsequent to the subframe at which the reservation signal is detected). Alternatively, the further prior valid subframe is a prescribed subframe in the DS period previously detected by the terminal device 1 (e.g., the subframe at which the SSS is transmitted in the case of the CSI measurement by the CRS, or the subframe to which the CSI-RS resource is allocated in the DS period in the case of the CSI measurement by the CSI-RS). Alternatively, the further prior valid subframe is an initial (with the smallest subframe index) valid subframe in a prescribed period (e.g., a single radio frame, DS cycle, or the like). The terminal device 1 holds measurement information of the CSI of the further prior valid subframe. In a case that there is no valid subframe even when referring to the prior subframes, the terminal device 1 measures the CSI based on the measurement information of the CSI of the held prior valid subframe to perform the CSI reporting.

The CSI reference resource defined for the channel measurement and the CSI reference resource defined for the interference measurement may be separately configured. In other words, the CSI reference resource for the first RS and the CSI reference resource for the second RS may be separately configured. The CSI reference resource defined for the channel measurement and the CSI reference resource defined for the interference measurement may be different valid downlink subframes or valid special subframes. Note that in a case that the CSI reference resource defined for the channel measurement and the CSI reference resource defined for the interference measurement are defined, a CSI reference resource for calculating the final CSI defined from the CSI reference resource defined for the channel measurement and the CSI reference resource defined for the interference measurement may be defined. The CSI reference resource defined for the channel measurement, the CSI reference resource defined for the interference measurement, and the CSI reference resource defined for calculating the final CSI are also referred to as a "first CSI reference resource", a "second CSI reference resource", and a "third CSI reference resource", respectively.

The subframe of the third CSI reference resource may be the same as the subframe of the first CSI reference resource. The subframe of the third CSI reference resource may be the same as the subframe of the second CSI reference resource.

For the third CSI reference resource, in a case that either the first CSI reference resource or the second CSI reference resource is not defined, the third CSI reference resource is not defined. In a case that the third CSI reference resource is not defined, the corresponding CSI reporting is omitted.

For the CSI reference resource, the terminal device 1 derives the CSI (CQI index and/or PMI and/or RI) from presuming a prescribed condition. A description is given below of an example of a prescribed condition in the CSI derivation for a non-LAA cell.

The terminal device 1 derives the CSI from presuming that the first 3 OFDM symbols are occupied by the control signal.

The terminal device 1 derives the CSI from presuming that the Resource Element is not used as the PSS, SSS, PBCH or EPDCCH.

The terminal device 1 derives the CSI from presuming a CP length of a non-MBSFN subframe.

The terminal device 1 derives the CSI from presuming that a Redundancy Version is 0.

The terminal device 1 derives the CSI from presuming that in a case where the CSI-RS is used for the channel measurement, a ratio of a PDSCH Energy Per Resource Element (EPRE) to a CSI-RS EPRE is decided according to a parameter Pc configured by the higher layer. Here, Pc is a parameter for notifying the ratio of the PDSCH EPRE to the CSI-RS EPRE.

The terminal device 1 derives the CSI from presuming that the CRS Resource Element exists in the non-MBSFN subframe in the CSI reporting in transmission mode 9.

In a case that PMI/RI reporting is configured to the terminal device 1, the terminal device 1 derives the CSI, in the CSI reporting in transmission mode 9, from presuming a URS overhead conditioned on a rank recently reported in a case where multiple CSI-RS ports are configured, and a URS overhead conditioned on a rank 1 transmission in a case where only a single CSI-RS is configured. The terminal device 1 derives the CSI, in the CSI reporting in transmission mode 9, from transmitting that in a case where the PMI/RI reporting is configured to the terminal device 1, the PDSCH is transmitted through the antenna port for the CSI-RS.

The terminal device 1 derives the CSI, in the CSI reporting in transmission mode 10, from presuming that in a case where the PMI/RI reporting is not configured to the CSI process, and the number of antenna ports for the CSI-RS resource corresponding to the CSI process is 1, the PDSCH transmission is transmitted through a single-antenna port, which is the port 7. Further, the terminal device 1 derives the CSI from presuming that the CRS Resource Element exists in the non-MBSFN subframe, and from presuming a CRS overhead, which is the same as a CRS overhead corresponding to the number of CRS antenna ports for the Serving cell. Further, the terminal device 1 derives the CSI from presuming the URS overhead to be 12 REs per a PRB pair.

The terminal device 1 derives the CSI, in the CSI reporting in transmission mode 10, from presuming that in a case where the PMI/RI reporting is not configured to the CSI process, and the number of antenna ports for the CSI-RS resource corresponding to the CSI process is 2, the PDSCH transmission scheme is a diversity transmission scheme using the antenna ports 0 and 1. Further, the terminal device 1 derives the CSI from presuming an overhead of the CRS REs, the number of which is the same as the number of antenna ports for the CSI-RS resource corresponding to the CSI process. Further, the terminal device 1 derives the CSI from presuming the URS overhead to be 0.

The terminal device 1 derives the CSI, in the CSI reporting in transmission mode 10, from presuming that in a case where the PMI/RI reporting is not configured to the CSI process, and the number of antenna ports for the CSI-RS resource corresponding to the CSI process is 4, the PDSCH transmission scheme is a diversity transmission scheme using the antenna ports 0, 1, 2 and 3. Further, the terminal device 1 derives the CSI from presuming an overhead of the CRS REs, the number of which is the same as the number of antenna ports for the CSI-RS resource corresponding to the CSI process. Further, the terminal device 1 derives the CSI from presuming the URS overhead to be 0.

Further, the terminal device 1 derives the CSI, in the CSI reporting in transmission mode 10, from presuming that in a case where the PMI/RI reporting is configured to the CSI process, the CRS Resource Element exists in the non-MBSFN subframe, and from presuming a CRS overhead, which is the same as a CRS overhead corresponding to the number of CRS antenna ports for the Serving cell. Further, the terminal device 1 derives the CSI from presuming a URS overhead conditioned on a rank recently reported in a case where multiple CSI-RS ports are configured, and a URS overhead conditioned on a rank 1 transmission in a case where only a single CSI-RS is configured. The terminal device 1 derives the CSI from transmitting that the PDSCH is transmitted on the antenna port for the CSI-RS.

The terminal device 1 derives the CSI from presuming that no Resource Element is allocated to the CSI-RS or zero-power CSI-RS.

The terminal device 1 derives the CSI from presuming that no Resource Element is allocated to the PRS.

The terminal device 1 derives the CSI from presuming that the transmission is performed by the PDSCH transmission scheme depending on the transmission mode configured to the terminal device 1.

The terminal device 1 derives the CSI from presuming that in a case where the CRS is used for the channel measurement, the ratio of the PDSCH EPRE to a CRS EPRE is decided based on a parameter PA and $\Delta_{offset}$ specified by the higher layer.

A description is given below of an example of a prescribed condition in the CSI derivation for the LAA cell. Note that only a difference from the prescribed condition in the CSI derivation for the non-LAA cell is described. Other conditions not mentioned below are the same as those of the non-LAA cell.

In the LAA cell, the PDCCH may not be transmitted. The first several symbols may not be transmitted for the CCA. In other words, the terminal device 1 derives the CSI from presuming that the signal is not transmitted at the first several OFDM symbols. The number of several OFDM symbols is any value of 0 to 3, and may be configured by the higher layer.

In the LAA cell, the CRS may not be transmitted. In other words, the terminal device 1 derives the CSI from presuming that in a case where the CSI-RS is used for the channel measurement in the LAA cell, no Resource Element is allocated to the CRS. Alternatively, only the CRS on the antenna port 0 may be transmitted in the LAA cell. In other words, the terminal device 1 derives the CSI from presuming that in a case where the CSI-RS is used for the channel measurement in the LAA cell, the CRS on the antenna port 0 is transmitted or the Resource Element is allocated to the CRS on the port 0. In other words, the terminal device 1 derives the CSI from presuming the CRS overhead to be 8 REs per a PRB pair.

Next, an example of the valid subframe (valid downlink subframe, valid special subframe) is described.

The valid subframe is a downlink subframe or special subframe which may be used for CSI measurement.

A subframe in a Serving cell which has some or all of the following conditions is considered to be valid. As one condition, a valid subframe is configured for the terminal device 1 as a downlink subframe or special subframe. As one condition, a valid subframe is not a Multimedia Broadcast multicast service Single Frequency Network (MBSFN) subframe in a prescribed transmission mode. As one condition, a valid subframe does not fall within a range of a measurement gap configured to the terminal device 1. As one condition, a valid subframe is an element or part of the CSI subframe set linked to the periodic CSI report, in a case that the terminal device 1 is configured with the CSI subframe set in the periodic CSI reporting. As one condition, a valid subframe is an element or part of the CSI subframe set linked to a subframe with the corresponding CSI request in the uplink DCI format in the aperiodic CSI reporting to the CSI process. Under the condition, the terminal device 1 is configured with a prescribed transmission mode, multiple CSI processes, and the CSI subframe set for the CSI process.

The subframe valid in the channel measurement may be different from the subframe valid in the interference measurement. For example, the subframe valid in the channel measurement is a subframe specified by the PDCCH, and the subframe valid in the interference measurement is a subframe of which transmission is detected using the transmission burst. For example, the subframe valid in the channel measurement is a subframe to which the CSI-RS is assigned through the CSI-RS configuration, and the subframe valid in the interference measurement is a subframe specified by the PDCCH. The subframe valid in the channel measurement and the subframe valid in the interference measurement are also referred to as a "first valid subframe" and a "second valid subframe", respectively.

The first CSI reference resource is decided based on the first valid subframe. The second CSI reference resource is decided based on the second valid subframe.

The third CSI reference resource may be decided based on the first valid subframe and second valid subframe. In this case, in a case that either the first valid subframe or the second valid subframe does not exist, the third CSI reference resource is not decided. The subframe of the third CSI reference resource may be the first valid subframe. The subframe of the third CSI reference resource may be the second valid subframe.

A description is given of an example of detection of RS existence, the RS being used for the CSI measurement in the LAA cell.

The base station device 2 can transmit, to the terminal device 1 to which the LAA cell is configured, information notifying whether the RS (CRS, CSI-RS, CSI-IM) for the CSI measurement (channel measurement and/or interference measurement) exists (is transmitted), or does not exist (is not transmitted). The terminal device 1 decides the subframe used for the CSI measurement based on the information. Hereinafter, the information is referred to as "RS existence information". In a case that the terminal device 1 recognizes (determines, judges, decides) that the RS exists based on the RS existence information notified by the base station device 2, the terminal device 1 can perform the CSI measurement. The subframe where it is recognized that the RS exists based on the RS existence information can be considered as the valid subframe.

The RS existence information is information for one or more Serving cells. The RS existence information associates one piece of notification information with a single Serving cell. The RS existence information, for example, has the notification information one piece of which is in units of 1 bit, and is constituted by a bitmap with one or more bits. Each bit in the bitmap corresponds to a prescribed Serving cell. In a case that a prescribed bit represents 1 (or 0), the terminal device 1 recognizes that the RS exists in the Serving cell corresponding to the prescribed bit. In a case that a prescribed bit represents 0 (or 1), the terminal device 1 recognizes that the RS does not exist in the Serving cell corresponding to the prescribed bit.

A relationship between the notification information and the Serving cell may be configured by a dedicated RRC message. For example, a Serving cell index corresponding to each bit may be configured. For example, the Serving cell of smaller Serving cell index (or the Serving cell of larger Serving cell index) may be assigned in order from the least significant bit (or the most significant bit) of the bitmap.

Note that the RS existence information may associate one piece of notification information with multiple Serving cells.

Moreover, the RS existence information is information for one or more CSI processes. The RS existence information associates one piece of notification information with a single CSI process. The RS existence information, for example, has the notification information one piece of which is in units of 1 bit, and is constituted by a bitmap with one or more bits. Each bit in the bitmap corresponds to a prescribed CSI process. In a case that a prescribed bit represents 1 (or 0), the terminal device 1 recognizes that the RS exists in the CSI process corresponding to the prescribed bit. In a case that a prescribed bit represents 0 (or 1), the terminal device 1 recognizes that the RS does not exist in the CSI process corresponding to the prescribed bit.

A relationship between the notification information and the CSI process may be configured by a dedicated RRC message. For example, a CSI process index corresponding to each bit may be configured. For example, the CSI process of smaller CSI process index (or the CSI process of larger CSI process index) may be assigned in order from the least significant bit (or the most significant bit) of the bitmap.

Note that the RS existence information may associate one piece of notification information with multiple CSI processes. Multiple CSI processes transmitted from the same transmission point may be notified by one piece of notification information.

Alternatively, the RS existence information is information for one or more subframes. The RS existence information associates one piece of notification information with a single subframe. The RS existence information, for example, has the notification information one piece of which is in units of 1 bit, and is constituted by a bitmap. Each bit in the bitmap corresponds to a prescribed subframe. In a case that a prescribed bit represents 1 (or 0), the terminal device 1 recognizes that the RS exists in the subframe corresponding to the prescribed bit. In a case that a prescribed bit represents 0 (or 1), the terminal device 1 recognizes that the RS does not exist in the subframe corresponding to the prescribed bit.

The subframe corresponding to the notification information may be the subframe at which the RS existence information is received, or a subframe after one or more subframes from the subframe at which the RS existence information is received. The subframe corresponding to the notification information may be preconfigured or configured by a dedicated RRC message. Moreover, the subframe corresponding to the notification information may be dynamically specified from among multiple subframe candidates. For example, the notification information of two or more bits may be used to specify the subframe where the RS exits.

Specifying the subframe may be made through relative information or absolute information. The relative information is a subframe offset value from the subframe at which the RS existence information is received, for example. The absolute information is a subframe number with reference to a System Frame Number (SFN), for example.

Note that one piece of notification information may be associated with multiple CSI subframes. Specifically, each bit in the bitmap may correspond to a subframe burst of prescribed contiguous subframes. For example, in a case that the information of existence is notified in a prescribed bit, the terminal device 1 recognizes that the RS exists in some or all of the subframes in the subframe burst corresponding to the prescribed bit. A length of the subframe burst may be preconfigured or configured by a dedicated RRC message. The length of the subframe burst may be the same as a length of the transmission burst.

Alternatively, the RS existence information is information for one or more corresponding terminal devices 1. The RS existence information associates one piece of notification information with a single terminal device 1. The RS existence information, for example, has the notification information one piece of which is in units of 1 bit, and is constituted by a bitmap with one or more bits. Each bit in the bitmap corresponds to a prescribed terminal device 1. In a case that a prescribed bit represents 1 (or 0), the terminal device 1 recognizes that the RS exists. In a case that a prescribed bit represents 0 (or 1), the terminal device 1 recognizes that the RS does not exist.

A relationship between the notification information and the terminal device 1 may be configured by a dedicated RRC message. For example, in the terminal device 1, an area to which the information for the terminal device 1 itself is notified is allocated by the higher layer. For example, the area is assigned such that the first 2 bits of the RS existence information are assigned with information destined for a terminal device 1-A, the next 2 bits are assigned with information destined for a terminal device 1-B. Note that the same notification information may be assigned to multiple terminal devices. In this case, the notification information may be configured common to multiple terminal devices.

Note that the RS existence information notified to the terminal device 1 is preferably information in combination with the above multiple correspondences in the RS existence information. For example, the RS existence information is preferably information for one or more Serving cells, and information for one or more CSI processes. Moreover, the RS existence information is preferably information for one or more Serving cells, and information for one or more CSI processes, and information for one or more Serving cells. Further, in the case of the combination of the multiple correspondences in the RS existence information, information not corresponded by a value of a field in the RS existence information is preferably implicitly specified using another state. Specifically, in a case that the value of the RS existence information does not correspond to the Serving cell, the Serving cell receiving the RS existence information preferably specifies the Serving cell. Specifically, in the case that the value of the RS existence information does not correspond to the subframe, the subframe is preferably specified at a timing of receiving the RS existence information.

An example of a method for notifying the RS existence information is described.

The RS existence information is allocated to the CSS of the Primary cell or Primary Secondary cell to be notified. The RS existence information is assigned to fields in a prescribed DCI format. The RS existence information is notified by the PDCCH or EPDCCH with a prescribed DCI format.

The DCI format including the RS existence information allocated to the CSS is preferably a DCI format allocated to the CSS. For example, a prescribed DCI format is preferably DCI format 1C, or constituted by the same number of bits as DCI format 1C. For example, a prescribed DCI format is preferably DCI format 3 or 3A, or constituted by the same number of bits as DCI format 3 or 3A.

The DCI format including the RS existence information allocated to the CSS may be notified together with other control information.

The Cyclic Redundancy Check (CRC) in the DCI format including the RS existence information allocated to the CSS is preferably scrambled by the Radio Network Temporary Identifier (RNTI) for identifying the RS existence information. The RNTI for identifying the RS existence information (hereinafter, referred to as "LAA-RNTI") is preferably configured to the terminal device 1 by a dedicated RRC message. The LAA-RNTI may be configured individually to the terminal device. This allows the terminal device to be identified without the need to add the information for identifying the terminal device to the RS existence information.

The PDCCH or EPDCCH in the DCI format including the RS existence information allocated to the CSS may be monitored at all the downlink subframes or special subframes.

From the viewpoint of load reduction of decode processing or the like, monitoring may be performed at only a specifiable subframe among the subframes where the RS is possibly allocated. In other words, the PDCCH or EPDCCH in the DCI format including the RS existence information allocated to the CSS may be monitored only at a subframe which is further configured by the higher layer from among the downlink subframes or special subframes. The subframe configured by the higher layer is a subframe to which the CSI-RS or CSI-IM is possibly allocated, and which is notified by use of a cycle and a subframe offset from the higher layer, for example. The subframe configured by the higher layer is a subframe at which the monitoring is instructed based on bitmap format information corresponding to the subframe in a single radio frame, for example.

An example of a method for notifying the RS existence information is described.

The RS existence information is allocated to the USS of the Primary cell, Primary Secondary cell, or Secondary cell to be notified. The RS existence information is assigned to fields in a prescribed DCI format. The RS existence information is notified by the PDCCH or EPDCCH in a prescribed DCI format.

The DCI format including the RS existence information allocated to the USS is a downlink grant (downlink assignment, downlink DCI format) or an uplink grant (uplink assignment, uplink DCI format).

A field for the RS existence information notified by the DCI format allocated to the USS may be configured and notified independently from other control information such as resource block assignment or CSI request. In this case, from the viewpoint of compatibility with a terminal device incapable of communicating in the LAA cell, the field for the RS existence information is preferably configured only in the case that the configuration is made by the higher layer. The case that the configuration is made by the higher layer is a case that, for example, there is configured configuration information used for the communication in the LAA cell, or configuration information for the carrier aggregation of 5 or more CCs. In this case, the RS existence information is information for the Serving cell scheduled with at least the DCI format. The RS existence information may be information for multiple Serving cells including the Serving cell scheduled with the DCI format.

The RS existence information notified by the DCI format allocated to the USS may be notified in a manner to be shared by other control information. Other control information is information of the CSI request requesting the CSI measurement and aperiodic CSI feedback from the terminal device 1, for example. In other words, a common field is configured for the RS existence information and the information of the CSI request. In this case, the RS existence information is information on whether the RS (CRS, CSI-RS) associated with the Serving cell and/or CSI process requested by the CSI request exists. In a case that the terminal device 1 receives the CSI request, the terminal device 1 recognizes that the RS associated with the Serving cell and/or CSI process exists in a prescribed subframe with respect to the Serving cell and/or CSI process and/or set of pairs of the CSI process and the CSI subframe set corresponding to the information of the CSI request. Then, the terminal device 1 uses a prescribed subframe to perform the CSI measurement and perform the aperiodic CSI feedback.

An example of a method for notifying the RS existence information is described.

The RS existence information is notified by a random access response in a non-collision based random access. The base station device 2 can use a field reserved for the Temporary C-RNTI to notify the terminal device 1 of the RS existence information, in the non-collision based random access. The terminal device 1 acquires the RS existence information from among fields reserved for the Temporary C-RNTI included in the random access response to recognize whether RS exists in the subframe and/or CSI process and/or subframe corresponding to the RS existence information.

The RS existence information may be notified by a random access response grant in the random access response in the non-collision based random access. The terminal device 1 may be notified by adding a field of the RS existence information to a field of the random access response grant. The terminal device 1 may acquire the RS existence information at the same time as information of the CSI request in the random access response grant.

The terminal device 1 can consider a subframe where the RS existing is detected according to the RS existence information as a valid downlink subframe or valid special subframe. In other words, the valid downlink subframe is a subframe where the RS existing is detected based on the above RS existence information in the terminal device 1.

Note that the RS existence information may be individually notified according to a kind of the RS. For example, first RS (CRS, CSI-RS) existence information used for the channel measurement and second RS (CRS, CSI-IM) existence information used for the interference measurement may be separately notified. Fields for the first RS existence information and the second RS existence information may be configured individually. The subframe specified by the first RS existence information is the first valid subframe. The subframe specified by the first RS existence information may be the first CSI reference resource. The subframe specified by the second RS existence information is the second valid subframe. The subframe specified by the second RS existence information may be the second CSI reference resource.

Note that the RS existence information may be notified common to the kind of the RS. For example, the first RS (CRS, CSI-RS) existence information used for the channel measurement and the second RS (CRS, CSI-IM) existence information used for the interference measurement may be notified common to a single field. In this case, in the identical field of the RS existence information, the Serving cell and/or CSI process and/or subframe and/or terminal device corresponding to the RS existence information may be different depending on the kind of the RS.

In a case of not receiving the RS existence information, the terminal device 1 recognizes that no RS exists in all the configured LAA cells and the RS exists in the Serving cell except for all the configured LAA cells. Alternatively, in the case of not receiving the RS existence information, the terminal device 1 recognizes that no RS exists in all the configured Secondary cells and the RS exists in the configured Primary cell or Primary Secondary cell.

Alternatively, in the case of not receiving the RS existence information, the terminal device 1 recognizes that no RS exists in the Serving cell where a prescribed transmission mode is configured and the RS exists in the Serving cell where another prescribed transmission mode other than the prescribed transmission mode is configured. The prescribed transmission mode is preferably the transmission mode suitable for communicating in the LAA cell (e.g., transmission mode 11).

Alternatively, in the case of not receiving the RS existence information, the terminal device 1 recognizes that no RS exists in the cell where a prescribed frame structure type is configured and the RS exists in the cell where a frame structure type other than the prescribed frame structure type is configured. The prescribed frame structure type is preferably the frame structure type suitable for communicating in the LAA cell (e.g., third frame structure type).

Note that even in a case where the terminal device 1 does not receive the RS existence information, in a case that detection of another RS existence leads to determination that the RS exists, the terminal device 1 may recognize that the RS exists in the Serving cell.

A description is given of an example of detection of RS existence used for the CSI measurement in the LAA cell.

The terminal device 1 to which the LAA cell is configured can determine whether the RS (CRS, CSI-RS, CSI-IM) for the CSI measurement (channel measurement, interference measurement) exists (is transmitted), or does not exist (is not transmitted) according to a state of the transmission from the base station device 2. Hereinafter, determination on the RS existence based on the transmission state is referred to as an "RS existence determination criterion". In a case that the terminal device 1 recognizes (determines, judges, decides) that the RS exists based on the RS existence determination criterion by the terminal device 1, the terminal device 1 can perform the CSI measurement. The subframe where it is recognized that the RS exists based on the RS existence determination criterion can be considered as the valid subframe.

An example of the RS existence determination criterion is described.

The terminal device 1 determines the RS existence based on the downlink grant from the base station device 2. The terminal device 1, in a case of receiving PDCCH or EPDCCH of the downlink grant for the Serving cell, determines that the RS exists in a prescribed subframe in the Serving cell. The terminal device 1, in a case of not receiving PDCCH or EPDCCH of the downlink grant for the Serving cell, may determine that the RS does not exist in a prescribed subframe in the Serving cell. The prescribed subframe is preferably a subframe with the PDSCH scheduled.

An example of the RS existence determination criterion is described.

The terminal device 1 determines the RS existence based on the reception of the PDCCH or EPDCCH transmitted from the base station device 2. The terminal device 1, in the case of receiving the PDCCH or EPDCCH in the Serving cell, determines that the RS exists in a prescribed subframe in the Serving cell. The terminal device 1, in the case of not receiving the PDCCH or EPDCCH for the Serving cell, may determine that the RS does not exist in a prescribed subframe in the Serving cell. The prescribed subframe is preferably a subframe at which the PDSCH or EPDCCH is received.

An example of the RS existence determination criterion is described.

The terminal device 1 determines the RS existence based on detection of the CRS transmitted from the base station device 2. The terminal device 1, in a case of detecting the CRS in the Serving cell, determines that the RS exists in a prescribed subframe in the Serving cell. The terminal device 1, in a case of not detecting the CRS in the Serving cell, may determine that the RS does not exist in a prescribed subframe in the Serving cell. The prescribed subframe is preferably a subframe at which the CRS is detected. The case that the CRS is detected is a case that a received power of the Resource Element where the CRS is allocated exceeds a threshold for deciding whether the CRS is detected, for example. The case that the CRS is not detected is a case that a received power of the Resource Element where the CRS is allocated falls below the threshold for deciding whether the CRS is detected, for example. The Resource Element where the CRS is allocated is defined based on a physical cell identifier (ID) and the number of CRS antenna ports and a CP type (normal CP or extended CP).

An example of the RS existence determination criterion is described.

The terminal device 1 determines the RS existence based on detection of the CSI-RS transmitted from the base station device 2. The terminal device 1, in a case of detecting the CSI-RS in the Serving cell, determines that the RS exists in a prescribed subframe in the Serving cell. The terminal device 1, in a case of not detecting the CSI-RS in the Serving cell, may determine that the RS does not exist in a prescribed subframe in the Serving cell. The prescribed subframe is preferably a subframe at which the CSI-RS is detected. The case that the CSI-RS is detected is a case that a received power of the Resource Element (CSI-RS resource) where the CSI-RS associated with the CSI process is allocated exceeds a threshold for deciding whether the CSI-RS is detected, for example. The case that the CSI-RS is not detected is a case that a received power of the Resource Element (CSI-RS resource) where the CSI-RS associated with the CSI process is allocated falls below the threshold for deciding whether the CSI-RS is detected, for example. The Resource Element where the CSI-RS is allocated is defined based on configuration information (CSI-RS-Config) of the CSI-RS configured by the higher layer.

An example of the RS existence determination criterion is described.

The terminal device 1 determines the RS existence based on detection of the reservation signal transmitted from the base station device 2. The terminal device 1, in a case of detecting the reservation signal in the Serving cell, determines that the RS exists in a prescribed subframe in the Serving cell. The terminal device 1, in a case of not detecting the reservation signal in the Serving cell, may determine that the RS does not exist in a prescribed subframe in the Serving cell. The prescribed subframe is preferably a subframe at which the reservation signal is detected, or a subframe after several subframes from the subframe at which the reservation signal is detected. The prescribed subframe may be several subframes contiguous to the subframe at which the reservation signal is detected. The prescribed subframe may be configured according to information of a value of offset from the subframe at which the reservation signal is detected by the RRC message, and the number of subframes contiguously transmitted, for example. The case that the reservation signal is detected is a case that a received power of the Resource Element where the reservation signal is allocated exceeds a threshold for deciding whether the reservation signal is detected, for example. The case that the reservation signal is not detected is a case that a received power of the Resource Element where the reservation signal is allocated falls below the threshold for deciding whether the reservation signal is detected, for example.

An example of the RS existence determination criterion is described.

The terminal device 1 determines the RS existence based on detection of the DS transmitted from the base station device 2. The terminal device 1, in a case of detecting the DS in the Serving cell, determines that the RS exists in a prescribed subframe in the Serving cell. The terminal device 1, in a case of not detecting the DS in the Serving cell, may determine that the RS does not exist in a prescribed subframe in the Serving cell. The prescribed subframe is preferably a subframe at which the DS is detected, or a subframe after several subframes from the subframe at which the DS is detected. The prescribed subframe may be all or some of the subframes in the DS period. The prescribed subframe may be configured according to information of a value of offset from the subframe at which the DS is detected by the RRC message, or the DS period, for example. The case that the DS is detected is a case that a received power of the Resource Element where the SSS in the first subframe in the DS period is allocated exceeds a threshold for deciding whether the DS is detected, for example. Alternatively, the case that the DS is detected is a case that a received power of the Resource Element where the CSI-RS in the subframe in the DS period is allocated exceeds the threshold for deciding whether the DS is detected, for example. The case that the DS is not detected is a case that a received power of the Resource Element where the SSS in the first subframe in the DS period is allocated falls below the threshold for deciding whether the DS is detected, for example. Alternatively, the case that the DS is not detected is a case that a received power of the Resource Element where the CSI-RS in the subframe in the DS period is allocated falls below the threshold for deciding whether the DS is detected, for example.

To the terminal device 1, one or more of the above RS existence determination criteria are applied. In a case of at least one of the above RS existence determination criteria is met, the terminal device 1 recognizes that the RS exists in the Serving cell and/or CSI process and/or subframe corresponding to the above RS existence determination criterion.

Note that the terminal device 1 may use two or more of the above RS existence determination criteria to determine the RS existence. For example, the terminal device 1 determines that the RS exists in a case that an RS existence condition is met in both the RS existence determination criterion using the reservation signal and the RS existence determination criterion using the CRS in a prescribed subframe. The terminal device 1 determines that the RS does not exist in a case that the RS existence condition is not met in either of the RS existence determination criterion using the reservation signal or the RS existence determination criterion using the CRS in a prescribed subframe.

The terminal device 1 can consider a subframe at which the RS existing is detected according to the RS existence determination criterion as a valid downlink subframe or valid special subframe. In other words, the valid downlink subframe is a subframe meeting the RS existence condition based on the above RS existence determination criterion in the terminal device 1.

Note that the RS existence determination criterion may be individually applied according to the kind of the RS. For example, existence determination criterion for first RS (CRS, CSI-RS) used for the channel measurement and existence determination criterion for second RS (CRS, CSI-IM) used for the interference measurement may be individually applied. The subframe where the RS is determined to exist under the existence determination criterion for first RS is the first valid subframe. The subframe where the RS is determined to exist under the existence determination criterion for first RS may be the first CSI reference resource. The subframe where the RS is determined to exist under the existence determination criterion for second RS is the second valid subframe. The subframe where the RS is determined to exist under the existence determination criterion for second RS may be the second CSI reference resource.

The detection of RS existence used for the CSI measurement may be determined in combination of multiple methods for detecting the RS. The terminal device 1 recognizes whether the RS exists in a prescribed subframe in the Serving cell based on the above RS existence information and the above RS existence determination criterion. The terminal device 1 recognizes whether a prescribed subframe is a valid subframe in the Serving cell based on the above RS existence information and the above RS existence determination criterion. For example, the terminal device 1 recognizes that the CRS exists in the subframe for which existence of the CRS is specified based on the RS existence determination criterion using the reservation signal and in the subframe for which existence of the CRS is specified based on the RS existence information.

The method for detecting the RS existence used for the CSI measurement may be different between the first RS used for the channel measurement and the second RS used for the interference measurement. For example, the detection of the CSI-RS existence is determined based on the RS existence information, and the detection of the CSI-IM existence is determined based on the RS existence determination criterion. For example, information on the DCI format indicates whether the CSI-RS resource associated with the Serving cell and/or CSI process specified by the information on the DCI format is valid, and detection of the transmission burst indicates whether the CSI-IM resource in the transmission burst in the Serving cell where the transmission burst is detected is valid. The subframe used in the measurement of the first RS used for the channel measurement and the subframe used in the measurement of the second RS used for the interference measurement may not be the same subframe. In other words, the valid subframe in the first RS used for the channel measurement and the valid subframe in the second RS used for the interference measurement may be different from each other. Moreover, in a case that the valid subframe exists in one RS and the valid subframe does not exist in the other RS, the CSI measurement may not be performed and the CSI report may be omitted.

The RS existence used for the CSI measurement may be determined in combination of information notified by the RRC message and the method for detecting the RS. For example, the terminal device 1 recognizes that the CSI-RS exists in the subframe which is specified by subframe information included in the configuration information of the CSI-RS and for which existence of the CIS-RS is specified based on the RS existence information. For example, the terminal device 1 recognizes that the CSI-IM exists in the subframe specified by subframe information included in the configuration information of the CSI-IM and in the subframe for which existence of the CSI-IM is specified based on the RS existence determination criterion using the reservation signal. For example, the terminal device 1 recognizes that the CSI-IM exists in the subframe specified by the subframe information included in the configuration information of the CSI-IM, the subframe for which existence of the CSI-IM is specified based on the RS existence determination criterion using the reservation signal, and the subframe for which existence of the CSI-IM is specified based on the RS existence information.

Note that in a case that the subframe at which the RS is detected is the subframe at which the transmission from the middle of symbols (including the subframe capable of the transmission until the middle of the symbols) can be performed, the terminal device 1, besides the detection of RS existence, further determines whether the RS exists based on information for recognizing the symbol at which the channel and/or signal is transmitted. Specifically, the terminal device 1 recognizes the symbol at which the channel and/or signal is transmitted based on the information for recognizing the symbol at which the channel and/or signal is transmitted, and as a result, in a case that the terminal device 1 recognizes that the RS is not transmitted or only a part of the RS is transmitted, the terminal device 1 recognizes that the RS does not exist. For example, in a case that the terminal device 1 recognizes that the OFDM symbols which are the symbols #0 to #3 in a prescribed subframe are transmitted from the base station device 2, the terminal device 1 recognizes that the CSI-RS or CSI-IM does not exist in the prescribed subframe. For example, in a case that the terminal device 1 recognizes that the OFDM symbols which are the symbols #12 to #13 are transmitted from the base station device 2, the terminal device 1 recognizes that the CRS does not exist in the prescribed subframe.

In the case that the CSI-RS is detected, the CRS may be considered to not exist.

Moreover, the terminal device 1 can derive at least the CQI in the subframe specified based on the detection of RS existence. Further, the terminal device 1 can perform the CSI measurement based on the detection of RS existence.

The terminal device 1 can perform the channel measurement in the subframe specified based on the detection of RS existence. Moreover, the terminal device 1 can perform the interference measurement in the subframe specified based on the detection of RS existence.

Further, the terminal device 1 can decide the CSI reference resource based on the detection of RS existence.

The terminal device 1 can recognize the valid downlink subframe or valid special subframe based on the detection of RS existence.

The terminal device 1 includes a measurement unit configured to measure the CSI based on the RS in the CSI reference resource. The CSI reference resource is a valid downlink subframe, and the valid downlink subframe is a subframe for which existence of the RS is specified. The valid downlink subframe is a subframe for which existence of the RS for the channel measurement is specified, and a subframe for which existence of the RS for the interference measurement is specified.

According to the above embodiments, the terminal device 1 can measure the CSI only in the subframe at which the RS is transmitted, allowing accurate CSI to be efficiently reported to the base station device 2.

Note that in a case that configuration required for the LAA communication (LAA-config) is made to a prescribed Serving cell for the terminal device 1, the prescribed Serving cell may be considered as an LAA cell. The configuration required for the LAA communication is a parameter concerning the reservation signal, a parameter concerning the CSI existence information, and a parameter concerning the RSSI measurement, for example.

Moreover, although the description has been given in each of the above-described embodiments by using the terms "Primary cell" and "PS cell", these terms need not always be used. For example, "Primary cell" in each of the above-described embodiments may be referred to as a "master cell", and a "PS cell" in each of the above-described embodiments may be referred to as a "Primary cell".

A program running on each of the base station device 2 and the terminal device 1 according to the present invention may be a program (a program for causing a computer to operate) that controls a Central Processing Unit (CPU) and the like in such a manner as to realize the functions according to the above-described embodiments of the present invention. The information handled in these devices is temporarily stored in a Random Access Memory (RAM) while being processed. Thereafter, the information is stored in various types of Read Only Memory (ROM) such as a flash ROM and a Hard Disk Drive (HDD), and when necessary, is read by the CPU to be modified or rewritten.

Note that the terminal device 1 and the base station device 2-1 or the base station device 2-2 according to the above-described embodiments may be partially realized by the computer. In this case, this configuration may be realized by recording a program for realizing such control functions on a computer-readable recording medium and causing a computer system to read the program recorded on the recording medium for execution.

Note that the "computer system" here is defined as a computer system built into the terminal device 1 or the base station device 2-1 or the base station device 2-2, and the computer system includes an OS and hardware components such as peripheral devices. Furthermore, the "computer-readable recording medium" refers to a portable medium such as a flexible disk, a magneto-optical disk, a ROM, and a CD-ROM, and a storage device such as a hard disk built into the computer system.

Moreover, the "computer-readable recording medium" may include a medium that dynamically retains the program for a short period of time, such as a communication line that is used to transmit the program over a network such as the Internet or over a communication line such as a telephone line, and a medium that retains, in that case, the program for a fixed period of time, such as a volatile memory within the computer system which functions as a server or a client. Furthermore, the program may be configured to realize some of the functions described above, and also may be configured to be capable of realizing the functions described above in combination with a program already recorded in the computer system.

Furthermore, the base station device 2-1 or base station device 2-2 according to the above-described embodiments can be realized as an aggregation (a device group) constituted of multiple devices. Devices constituting the device group may be each equipped with some or all portions of each function or each functional block of the base station device 2-1 or base station device 2-2 according to the above-described embodiments. It is only required that the device group itself include general functions or general functional blocks of the base station device 2-1 or base station device 2-2. Furthermore, the terminal device 1 according to the above-described embodiments can also communicate with the base station device as the aggregation.

Furthermore, the base station device 2-1 or base station device 2-2 according to the above-described embodiments may be an Evolved Universal Terrestrial Radio Access Network (E-UTRAN). Furthermore, the base station device 2-1 or base station device 2-2 according to the above-described embodiments may have some or all portions of a function of a higher node for an eNodeB.

Furthermore, some or all portions of each of the terminal device 1 and the base station device 2-1 or base station device 2-2 according to the above-described embodiments may be typically realized as a large-scale integration (LSI) that is an integrated circuit or may be realized as a chip set. The functional blocks of each of the terminal device 1 and the base station device 2-1 or base station device 2-2 may be individually realized as a chip, or some or all of the functional blocks may be integrated into a chip. Furthermore, a circuit integration technique is not limited to the LSI, and may be realized with a dedicated circuit or a general-purpose processor. Furthermore, in a case where, with advances in semiconductor technology, a circuit integration technology with which an LSI is replaced appears, it is also possible to use an integrated circuit based on the technology.

Furthermore, according to the above-described embodiments, the cellular mobile station device is described as one example of a terminal device or a communication device, but the present invention is not limited to this, and can be applied to a fixed-type electronic apparatus installed indoors or outdoors, or a stationary-type electronic apparatus, for example, a terminal device or a communication device, such as an audio-video (AV) apparatus, a kitchen apparatus, a cleaning or washing machine, an air-conditioning apparatus, office equipment, a vending machine, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Furthermore, various modifications are possible within the scope of the present invention defined by claims, and embodiments that are made by suitably combining technical means disclosed according to the different embodiments are also included in the technical scope of the present invention. Furthermore, a configuration in which a constituent element that achieves the same effect is substituted for the one that is described according to the embodiments is also included in the technical scope of the present invention.

Supplemental Note

The present invention can be represented also as below.

(1) To accomplish the object described above, the present invention is contrived to provide the following means. Specifically, a terminal device according to an aspect of the present invention is a terminal device and includes a measurement unit configured to measure CSI based on an RS in a CSI reference resource. The CSI reference resource is a valid downlink subframe, and the valid downlink subframe is a subframe for which existence of the RS is specified.

(2) The terminal device according to an aspect of the present invention is the above-described terminal device and includes a reception unit configured to receive a PDCCH. The subframe for which the existence of the RS is specified is a subframe specified by a PDCCH DCI format.

(3) The terminal device according to an aspect of the present invention is the above-described terminal device, and the PDCCH is allocated to a CSS to be transmitted.

(4) The terminal device according to an aspect of the present invention is the above-described terminal device, and the subframe for which the existence of the RS is specified is a subframe at which RS transmission is detected.

(5) The terminal device according to an aspect of the present invention is the above-described terminal device, and the subframe for which the existence of the RS is specified is a subframe in a section in which transmission is continuously performed.

(6) The terminal device according to an aspect of the present invention is the above-described terminal device, and the valid downlink subframe is a subframe for which existence of the RS for the channel measurement is specified, and a subframe for which existence of the RS for the interference measurement is specified.

(7) A base station device according to an aspect of the present invention is a base station device, and includes a reception unit configured to receive CSI based on an RS in a CSI reference resource. The CSI reference resource is a valid downlink subframe, and the valid downlink subframe is a subframe for which existence of the RS is specified.

(8) The base station device according to an aspect of the present invention is the above-described base station device, and includes a transmission unit configured to transmit a PDCCH. The subframe for which existence of the RS is specified is a subframe specified by a PDCCH DCI format.

(9) The base station device according to an aspect of the present invention is the above-described base station device, and the PDCCH is allocated to a CSS to be transmitted.

(10) The base station device according to an aspect of the present invention is the above-described base station device, and the subframe for which existence of the RS is specified is a subframe at which the RS is transmitted.

(11) The base station device according to an aspect of the present invention is the above-described base station device, and the subframe for which existence of the RS is specified is a subframe in a section in which transmission is continuously performed.

(12) The base station device according to an aspect of the present invention is the above-described base station device, and the valid downlink subframe is a subframe for which existence of the RS for channel measurement is specified, and a subframe for which existence of the RS for interference measurement is specified.

(13) A communication method according to an aspect of the present invention is a communication method for a terminal device, and includes the step of measuring CSI based on an RS in a CSI reference resource. The CSI reference resource is a valid downlink subframe, and the valid downlink subframe is a subframe for which existence of the RS is specified.

(14) An integrated circuit according to an aspect of the present invention is an integrated circuit mounted on a terminal device, and implements a function of measuring CSI based on an RS in a CSI reference resource. The CSI reference resource is a valid downlink subframe, and the valid downlink subframe is a subframe for which existence of the RS is specified.

REFERENCE SIGNS LIST

501 Higher layer
502 Control unit
503 Codeword generation unit
504 Downlink subframe generation unit
505 Downlink Reference Signal generation unit
506 OFDM signal transmission unit
507 Transmit antenna
508 Receive antenna
509 SC-FDMA signal reception unit
510 Uplink subframe processing unit
511 Uplink control information extraction unit
601 Receive antenna
602 OFDM signal reception unit
603 Downlink subframe processing unit
604 Downlink Reference Signal extraction unit
605 Transport block extraction unit
606, 1006 Control unit
607, 1007 Higher layer
608 Channel state measurement unit
609, 1009 Uplink subframe generation unit
610 Uplink control information generation unit
611, 612, 1011 SC-FDMA signal transmission unit
613, 614, 1013 Transmit antenna

The invention claimed is:

1. A terminal device comprising:
a measurement unit configured to measure Channel State Information (CSI) based on a valid downlink subframe based on a Serving cell, wherein
a subframe is considered to be the valid downlink subframe in a case that a condition is met,
the condition includes that a configured CSI Reference Signal (CSI-RS) resource associated with a Channel State Information process is in the subframe, and
the Serving cell is a Licensed-Assisted Access (LAA) Secondary cell,
the condition includes that the subframe is configured as a downlink subframe or a special subframe, that the subframe is not a Multimedia Broadcast multicast service Single Frequency Network (MBSFN) subframe, and that the subframe does not fall within a configured measurement gap,
for periodic CSI reporting, the condition includes that the subframe is an element of a CSI subframe set linked to the periodic CSI report, and
for aperiodic CSI reporting for the CSI process, the condition includes that the subframe is an element of a CSI subframe set linked to a subframe with a corresponding CSI request in an uplink Downlink Control Information (DCI) format.

2. The terminal device according to claim 1, wherein in a case that the configured CSI Reference Signal resource associated with the Channel State Information process is not in the subframe, the subframe is considered not to be the valid downlink subframe.

3. A terminal device comprising:
a measurement unit configured to measure Channel State Information (CSI) based on a valid downlink subframe based on a Serving cell, wherein
a subframe is considered to be the valid downlink subframe in a case that a condition is met,
the condition includes that a configured CSI Reference Signal (CSI-RS) resource associated with a Channel State Information process is in the subframe,
the Serving cell is a Licensed-Assisted Access (LAA) Secondary cell,
the subframe is considered to be the valid downlink subframe according to whether or not all Orthogonal Frequency-Division Multiplexing (OFDM) symbols in the subframe are used for transmission of at least one of a physical downlink channel and a physical downlink signal,
wherein in a case that the field in the downlink control information indicates that at least one OFDM symbol in the subframe is not used for the transmission, the subframe is considered not to be the valid downlink subframe,
wherein in a case that the field in the downlink control information indicates that all the OFDM symbols in the subframe are used for the transmission, the subframe is considered to be the valid downlink subframe.

4. A terminal device comprising:
a measurement unit configured to measure Channel State Information (CSI) based on a valid downlink subframe based on a Serving cell, wherein
a subframe is considered to be the valid downlink subframe in a case that a condition is met,
the condition includes that a configured CSI Reference Signal (CSI-RS) resource associated with a Channel State Information process is in the subframe,
the Serving cell is a Licensed-Assisted Access (LAA) Secondary cell, the subframe is considered to be the valid downlink subframe according to a field in downlink control information, the field indicates configuration of Orthogonal Frequency-Division Multiplexing (OFDM) symbols in the subframe, the OFDM symbols are used for transmission of at least one of a physical downlink channel and a physical downlink signal, and a Physical Downlink Control Channel (PDCCH) with the downlink control information including Cyclic Redundancy Check (CRC) scrambled by a Radio Network Temporary Identifier (RNTI) is detected.

* * * * *